(12) United States Patent
Fukui et al.

(10) Patent No.: US 8,045,197 B2
(45) Date of Patent: Oct. 25, 2011

(54) DATA PROCESSING SYSTEM, DATA PROCESSING APPARATUS, AND DATA PROCESSING PROGRAM PRODUCT SUITED FOR TRANSMITTING AND RECEIVING DATA AMONG A PLURALITY OF IMAGE PROCESSING APPARATUSES

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1123 days.

(21) Appl. No.: 11/254,871

(22) Filed: Oct. 21, 2005

(65) Prior Publication Data

US 2007/0011198 A1    Jan. 11, 2007

(30) Foreign Application Priority Data

Jul. 6, 2005    (JP) ................................ 2005-198142

(51) Int. Cl.
    *G06F 3/12*    (2006.01)

(52) U.S. Cl. ...................................... 358/1.15; 358/1.16

(58) Field of Classification Search .................... 707/10; 715/234; 358/1.15, 448, 1.16; 711/154; 455/445, 456.6
    See application file for complete search history.

(56) References Cited

U.S. PATENT DOCUMENTS

| | | | |
|---|---|---|---|
| 5,699,494 A * | 12/1997 | Colbert et al. ............... | 358/1.15 |
| 6,246,487 B1 | 6/2001 | Kobayashi et al. | |
| 7,444,354 B2 * | 10/2008 | Kaburagi et al. ............... | 707/10 |
| 2002/0027673 A1 * | 3/2002 | Roosen et al. ................ | 358/1.15 |
| 2002/0099707 A1 * | 7/2002 | Matsumoto ..................... | 707/10 |
| 2004/0030684 A1 | 2/2004 | Nakata et al. | |
| 2004/0162076 A1 * | 8/2004 | Chowdry et al. ............. | 455/445 |
| 2004/0185877 A1 * | 9/2004 | Asthana et al. ............ | 455/456.6 |
| 2004/0190057 A1 * | 9/2004 | Takahashi et al. ........... | 358/1.15 |

(Continued)

FOREIGN PATENT DOCUMENTS

EP    0 929 023 A1    7/1999

(Continued)

OTHER PUBLICATIONS

Notification of Grounds of Rejection in JP 2005-198142 dated Mar. 18, 2008, and Translation thereof.

(Continued)

*Primary Examiner* — Twyler Haskins
*Assistant Examiner* — Nicholas Pachol
(74) *Attorney, Agent, or Firm* — Buchanan Ingersoll & Rooney PC

(57) ABSTRACT

The data processing system includes a storage portion to store user data that at least includes user identification information for identifying a user, a destination designation portion to display a user identified by the user identification information stored in the storage portion so as to allow designation of the user as a destination and a data designation portion to designate data to be delivered to the destination designated by the destination designation portion, a processing method designation portion to designate a processing method for processing the data, a user identification information input portion to accept an input of user identification information, a data extracting portion to extract data whose destination is the user specified by the user identification information inputted, and a data processing portion to process the extracted data by a processing method designated by the processing method designation portion.

25 Claims, 26 Drawing Sheets

U.S. PATENT DOCUMENTS

| | | | |
|---|---|---|---|
| 2005/0097171 A1 | 5/2005 | Hikichi | |
| 2005/0144200 A1* | 6/2005 | Hesselink et al. | 707/204 |
| 2006/0200735 A1* | 9/2006 | Ormond | 715/234 |
| 2006/0274358 A1* | 12/2006 | Fukui et al. | 358/1.15 |
| 2006/0274359 A1* | 12/2006 | Fukui et al. | 358/1.15 |
| 2006/0274360 A1* | 12/2006 | Fukui et al. | 358/1.15 |
| 2007/0011410 A1* | 1/2007 | Fukui et al. | 711/154 |
| 2007/0053008 A1* | 3/2007 | Kadowaki | 358/448 |
| 2007/0097425 A1* | 5/2007 | Kajita et al. | 358/1.15 |

FOREIGN PATENT DOCUMENTS

| | | |
|---|---|---|
| EP | 1 120 701 A1 | 8/2001 |
| JP | 6-62146 | 3/1994 |
| JP | 07-162566 | 6/1995 |
| JP | 10-42114 | 2/1998 |
| JP | 11-184777 | 7/1999 |
| JP | 2001-249929 | 9/2001 |
| JP | 2001-306204 | 11/2001 |
| JP | 2002-324102 | 11/2002 |
| JP | 2003-006187 | 1/2003 |
| JP | 2004-013210 | 1/2004 |
| JP | 2004-15629 | 1/2004 |
| JP | 2004-185423 | 7/2004 |
| JP | 2004-289673 | 10/2004 |
| JP | 2004-297485 | 10/2004 |
| JP | 2005-202223 | 1/2005 |
| JP | 2005-158038 | 6/2005 |
| WO | 02/41133 A2 | 5/2002 |

OTHER PUBLICATIONS

International Search Report dated Aug. 14, 2006.

Office Action issued in corresponding Application CN 200610075116.7, and English translation thereof.

* cited by examiner

Fig. 4A

REGISTERED USER INFORMATION OF MFP 100

| NUMBER | USER IDENTIFICATION INFORMATION | DIVISION NAME | E-mail ADDRESS | FACE IMAGE | PASSWORD |
|---|---|---|---|---|---|
| 1 | DAVID | SECRETARIAT | david@xxx.jp | david.jpg | xxx |

Fig. 4B

REGISTERED USER INFORMATION OF MFP 100A

| NUMBER | USER IDENTIFICATION INFORMATION | DIVISION NAME | E-mail ADDRESS | FACE IMAGE | PASSWORD |
|---|---|---|---|---|---|
| 2 | JULIE | PLANNING DIVISION | julie@xxx.jp | julie.jpg | xxxx |

Fig. 4C

REGISTERED USER INFORMATION OF MFP 100B

| NUMBER | USER IDENTIFICATION INFORMATION | DIVISION NAME | E-mail ADDRESS | FACE IMAGE | PASSWORD |
|---|---|---|---|---|---|
| 3 | TED | GENERAL AFFAIRS DIVISION | ted@xxx.jp | ted.jpg | xxxxx |

Fig. 4D

REGISTERED USER INFORMATION OF MFP 100C

| NUMBER | USER IDENTIFICATION INFORMATION | DIVISION NAME | E-mail ADDRESS | FACE IMAGE | PASSWORD |
|---|---|---|---|---|---|
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

Fig. 4E

FIRST USER DATA OF MFP 100

| NUMBER | USER IDENTIFICATION INFORMATION | DIVISION NAME | E-mail ADDRESS | FACE IMAGE | PASSWORD | HOME TERMINAL | LOCATION WHERE HOME TERMINAL IS DISPOSED |
|---|---|---|---|---|---|---|---|
| 1 | DAVID | SECRETARIAT | david@xxx.jp | david.jpg | xxx | IP ADDRESS OF MFP 100 | 19th FLOOR COPIER ROOM |
| 2 | JULIE | PLANNING DIVISION | julie@xxx.jp | julie.jpg | xxxx | IP ADDRESS OF MFP 100A | 5th FLOOR PLANNING DIVISION |
| 3 | TED | GENERAL AFFAIRS DIVISION | ted@xxx.jp | ted.jpg | xxxxx | IP ADDRESS OF MFP 100B | 4th FLOOR CONFERENCE ROOM |
| 4 | MICHAEL | DEVELOPMENT DIVISION | michael@xxx.jp | michael.jpg | xxxxx | IP ADDRESS OF MFP 100C | 14th FLOOR CONFERENCE ROOM |
| 5 | SUSAN | RESEARCH DIVISION | susan@xxx.jp | susan.jpg | xxxxxx | IP ADDRESS OF MFP 100C | 7th FLOOR LABORATORY |

Fig. 4F

SECOND USER DATA OF MFP 100

| NUMBER | USER IDENTIFICATION INFORMATION | DIVISION NAME | E-mail ADDRESS | FACE IMAGE | PASSWORD | HOME TERMINAL | LOCATION WHERE HOME TERMINAL IS DISPOSED |
|---|---|---|---|---|---|---|---|
| 2 | JULIE | PLANNING DIVISION | julie@xxx.jp | julie.jpg | xxxx | IP ADDRESS OF MFP 100A | 5th FLOOR PLANNING DIVISION |
| 3 | TED | GENERAL AFFAIRS DIVISION | ted@xxx.jp | ted.jpg | xxxxx | IP ADDRESS OF MFP 100B | 4th FLOOR CONFERENCE ROOM |
| 4 | MICHAEL | DEVELOPMENT DIVISION | michael@xxx.jp | michael.jpg | xxxxx | IP ADDRESS OF MFP 100C | 14th FLOOR CONFERENCE ROOM |
| 5 | SUSAN | RESEARCH DIVISION | susan@xxx.jp | susan.jpg | xxxxxx | IP ADDRESS OF MFP 100C | 7th FLOOR LABORATORY |

```
NUMBER                  1

USER
IDENTIFICATION         DAVID
INFORMATION

DIVISION NAME          SECRETARIAT

ELECTRONIC             david@xxx.jp
MAIL ADDRESS

FACE IMAGE             (FACE)
```

Fig. 8

JOB ATTRIBUTE INFORMATION

| TRANSMISSION ORIGIN INFORMATION | DESTINATION INFORMATION | | IMAGE DATA INFORMATION | |
|---|---|---|---|---|
| USER IDENTIFICATION INFORMATION | USER IDENTIFICATION INFORMATION | APPARATUS IDENTIFICATION INFORMATION OF HOME TERMINAL | APPARATUS IDENTIFICATION INFORMATION | FILE NAME |

Fig. 9

```
PROCESSING METHOD
☐ PROTOCOL
    ○ FTP            [IP ADDRESS        ]
    ○ ELECTRONIC     [ELECTRONIC MAIL ADDRESS][@][        ]
      MAIL                            ⎧ ○ NORMAL
    ○ FAX            TRANSMISSION MODE ⎨ ○ FINE
                                      ⎩ ○ SUPER
    ○ PRINTOUT       [APPARATUS NAME   ]

☐ IMAGE PROCESSING
    ○ ENLARGEMENT    [        ] %
    ○ REDUCTION      [        ] %
    ○ EDGE ENHANCEMENT
    ○ SMOOTHING

☐ PRINT PROCESS (ONLY UPON DESIGNATION OF PRINTOUT)
    ◉ COLOR          ○ BLACK-AND-WHITE
    ○ STAPLING
    ○ 2 in 1
    ○ DOUBLE-SIDED
    ○ DUAL PAGE
```

```
PROCESSING METHOD
☐ PROTOCOL
    ○ FTP
    ○ ELECTRONIC MAIL
    ○ FAX          TRANSMISSION MODE  { ○ NORMAL
                                        ○ FINE
                                        ○ SUPER
    ○ PRINTOUT
☐ IMAGE PROCESSING
    ○ ENLARGEMENT   [      ] %
    ○ REDUCTION     [      ] %
    ○ EDGE ENHANCEMENT
    ○ SMOOTHING
☐ PRINT PROCESS (ONLY UPON DESIGNATION OF PRINTOUT)
    ◉ COLOR        ○ BLACK-AND-WHITE
    ○ STAPLING
    ○ 2 in 1
    ○ DOUBLE-SIDED
    ○ DUAL PAGE
```

Fig. 11

JOB ATTRIBUTE INFORMATION

| TRANSMISSION ORIGIN INFORMATION | DESTINATION INFORMATION | | IMAGE DATA INFORMATION | | PROCESSING METHOD | |
|---|---|---|---|---|---|---|
| USER IDENTIFICATION INFORMATION | USER IDENTIFICATION INFORMATION | APPARATUS IDENTIFICATION INFORMATION OF HOME TERMINAL | APPARATUS IDENTIFICATION INFORMATION | FILE NAME | PROTOCOL | IMAGE PROCESSING | PRINT PROCESS |

Fig. 14A

DETECTION PROCESS A
DETECTING TERMINAL

↓
S91 TRANSMIT REQUEST FOR DETECTION OF HOME TERMINAL BY BROADCAST
↓
S92 APPARATUS IDENTIFICATION INFORMATION RECEIVED?
— NO → S94 SET AS HOME TERMINAL BEING NONEXISTENT
— YES → S93 SET AS HOME TERMINAL
↓
RETURN

Fig. 14B

DETECTION PROCESS B
DETECTED TERMINAL

↓
S95 DETECTION REQUEST RECEIVED?
— NO → (loop)
— YES ↓
S96 IS THERE REGISTERED USER INFORMATION STORED?
— NO → (loop back)
— YES ↓
S97 TRANSMIT APPARATUS IDENTIFICATION INFORMATION
↓
END

USER IDENTIFICATION INFORMATION
APPARATUS IDENTIFICATION INFORMATION

Fig. 16A

FIRST USER DATA OF MFP 100

| NUMBER | USER IDENTIFICATION INFORMATION | DIVISION NAME | E-mail ADDRESS | FACE IMAGE | PASSWORD |
|---|---|---|---|---|---|
| 1 | DAVID | SECRETARIAT | david@xxx.jp | david.jpg | xxx |
| 2 | JULIE | PLANNING DIVISION | julie@xxx.jp | julie.jpg | xxxx |
| 3 | TED | GENERAL AFFAIRS DIVISION | ted@xxx.jp | ted.jpg | xxxxx |
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

Fig. 16B

SECOND USER DATA OF MFP 100

| NUMBER | USER IDENTIFICATION INFORMATION | DIVISION NAME | E-mail ADDRESS | FACE IMAGE | PASSWORD |
|---|---|---|---|---|---|
| 2 | JULIE | PLANNING DIVISION | julie@xxx.jp | julie.jpg | xxxx |
| 3 | TED | GENERAL AFFAIRS DIVISION | ted@xxx.jp | ted.jpg | xxxxx |
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

Fig. 18

JOB ATTRIBUTE INFORMATION

| TRANSMISSION ORIGIN INFORMATION | DESTINATION INFORMATION | IMAGE DATA INFORMATION | | |
|---|---|---|---|---|
| USER IDENTIFICATION INFORMATION | USER IDENTIFICATION INFORMATION | APPARATUS IDENTIFICATION INFORMATION | FILE NAME | |

DATA PROCESSING SYSTEM, DATA PROCESSING APPARATUS, AND DATA PROCESSING PROGRAM PRODUCT SUITED FOR TRANSMITTING AND RECEIVING DATA AMONG A PLURALITY OF IMAGE PROCESSING APPARATUSES

This application is based on Japanese Patent Application No. 2005-198142 filed with Japan Patent Office on Jun. 6, 2005, the entire content of which is hereby incorporated by reference.

BACKGROUND OF THE INVENTION

1. Field of the Invention

The present invention relates to a data processing system, a data processing apparatus, and a data processing program product, and more specifically to a data processing system, a data processing apparatus, and a data processing program product suited for transmitting and receiving data among a plurality of image processing apparatuses connected to a network.

2. Description of the Related Art

Conventionally, when data is to be transmitted, the sender is required to set a variety of information related to the receiver and the destination of the transmission. For instance, when a document is to be transmitted by facsimile, the sender is required to set the facsimile number of the receiver, and when an image scanned by a copying machine is to be transmitted by an electronic mail, the sender is required to set the electronic mail address of the receiver. Moreover, with regard to an FTP (File Transfer Protocol) transmission function and an SMB (Server Message Block) transmission function provided in recent copying machines, the setting of information (FTP server address, name of personal computer, etc.) of the receiver by the sender is required. Although, upon the actual transmission, the information of the receiver need not be set every time if the information of the receiver is registered in advance, the information of the receiver is required upon the registration nonetheless.

Thus, when such information of the receiver as a facsimile number, an electronic mail address, an FTP server address, and a name of the personal computer is unknown, data cannot be transmitted to the receiver. Therefore, advance confirmation of the information of the receiver will be required, which is rather a troublesome task for the sender.

In addition, since the sender basically selects as a transmission method one of a facsimile transmission, an electronic mail transmission, an FTP transmission, an SMB transmission, and the like at his convenience, the transmitted data is not in a form that takes the convenience of the receiver into consideration. Sometimes, after receiving the data, the receiver is forced to process the received data in some way later on in order to make the data easier to utilize, and at other times, the receiver may not even be able to perform such processing and thus feel inconvenienced. In order to resolve such inconvenience, the sender must confirm the transmission method desired by the receiver before the transmission.

On the other hand, Japanese Patent Laying-Open No. 2005-20223 describes an image processing apparatus including a transmission means that transmits image information and an image information accumulating means that accumulates at a registered address the image information received by the transmission means, wherein the image processing apparatus is characterized in that it includes a registered address information transmission means that, upon reception of a request from the other end of the communication or upon reception of an address designation command that designates an unregistered address, transmits the information related to the registered address to the other end of the communication according to the request or the address designation command. The image processing apparatus according to Japanese Patent Laying-Open No. 2005-20223 is a facsimile machine.

With the image processing apparatus according to Japanese Patent Laying-Open No. 2005-20223, upon a facsimile transmission, the facsimile transmission can be performed without the sender making an inquiry to the receiver even when the sender has forgotten the information related to the address registered in the facsimile on the receiver side; however, the sender needs to know the facsimile number of the facsimile on the receiver side. Moreover, since the receiver can only receive the data through a facsimile, the demand of the receiver will not be met when, for instance, the receiver desires an image of a resolution higher than that of an image received by a facsimile.

SUMMARY OF THE INVENTION

The present invention is made to solve the above-described problems, and an object of the present invention is to provide a data processing system, a data processing apparatus, and a data processing program product which facilitate the designation of a destination of data while allowing the data to be obtained by a processing method desired by a user at the destination.

Another object of the present invention is to provide a data processing system, a data processing apparatus, and a data processing program product that allow data to be obtained by a processing method desired by a user of a destination.

To achieve the above-described objects, according to one aspect of the present invention, an image data processing system includes a user data storage portion to store user data including user identification information for identifying each user, a destination designation portion to display a user identified by the user identification information stored in the user data storage portion so as to designate the user as a destination, a data designation portion to designate image data for the destination designated in the destination designation portion, a data processing method designation portion to designate a data processing method for the image data, wherein the data processing method is designated by the user designated as the destination, a user identification information input portion to accept an input of user identification information, a data extracting portion to extract image data for the user specified by the user identification information inputted in the user identification information input portion, and a data processing portion to process the image data extracted by the data extracting portion based on the data processing method designated in the data processing method designation portion.

According to this aspect, user data that at least includes user identification information for identifying a user is stored, and the user identified by the user identification information stored is displayed in such a manner that it can be designated as a destination so that there is no need to input the information of the destination, and it is only required to designate the user as the destination. Thus, the sender can deliver the data without confirming the processing method desired by the user who becomes the destination. Moreover, when user identification information is inputted, the data whose destination is a user specified by that user identification information is extracted and processed by a designated processing method so that the user of the destination can obtain data processed by a desired processing method. As a result, a data processing system which facilitates the destination designation of data while allowing the data to be obtained by a processing method desired by the user of the destination can be provided.

According to another aspect of the present invention, an image data processing system includes a user data storage portion to store user data including user identification information for identifying each user, a data input portion into which image data is inputted, a relation portion to associate the image data with the user identification information stored in the user data storage portion, a destination designation portion to designate a user identified by the user identification information as a destination, a data processing method designation portion to designate a data processing method for the image data, wherein the data processing method is designated by the user designated as the destination, a user identification information input portion to accept an input of user identification information, a data extracting portion to extract image data for the user specified by the user identification information inputted in the user identification information input portion, and a data processing portion to process the image data extracted by the data extracting portion based on the data processing method designated in the data processing method designation portion.

According to this aspect, user data that at least includes user identification information for identifying a user is stored, inputted data is associated with the user identification information, and the user of the user identification information associated with the inputted data is designated as a destination. Moreover, when the user identification information is inputted, the data whose destination is the user specified by that user identification information is extracted and processed by a designated processing method so that the user of the destination can obtain the data processed by the desired processing method. As a result, a data processing system which allows data to be obtained by a processing method desired by the user of the destination can be provided.

According to a further aspect of the present invention, an image data processing apparatus connected to a network includes a user data storage portion to store user data including user identification information for identifying each user, a destination designation portion to display a user identified by the user identification information stored in the user data storage portion so as to designate the user as a destination, a data designation portion to designate image data for the destination designated in the destination designation portion, a data processing method designation portion to designate a data processing method for the image data, wherein the data processing method is designated by the user designated as the destination, a user identification information input portion to accept an input of user identification information, a data extracting portion to extract image data for the user specified by the user identification information inputted in the user identification information input portion, and a data processing portion to process the image data extracted by the data extracting portion based on the data processing method designated in the data processing method designation portion.

According to this aspect, a data processing apparatus which facilitates destination designation of data while allowing the data to be obtained by a processing method desired by a user of a destination can be provided.

According to a still another aspect of the present invention, an image data processing apparatus connected to a network includes a user data storage portion to store user data including user identification information for identifying each user, a data input portion into which image data is inputted, a relation portion to associate the image data with the user identification information stored in the user data storage portion, a destination designation portion to designate a user identified by the user identification information as a destination, a data processing method designation portion to designate a data processing method for the image data, wherein the data processing method is designated by the user designated as the destination, a user identification information input portion to accept an input of user identification information, a data extracting portion to extract image data for the user specified by the user identification information inputted in the user identification information input portion, and a data processing portion to process the image data extracted by the data extracting portion based on the data processing method designated in the data processing method designation portion.

According to this aspect, a data processing apparatus which allows data to be obtained by a processing method desired by a user of a destination can be provided.

According to a still further aspect of the present invention, an image data processing program for an image data processing apparatus includes the steps of storing user data including user identification information for identifying each user; in setting for image data output, displaying a user identified by the user identification information stored in the user data storage portion, and allowing to designate the user as a destination; designating image data for the destination designated in the destination designation portion; in outputting image data, designating a data processing method for the image data, wherein the data processing method is designated by the user designated as the destination; accepting an input of user identification information; extracting image data for the user specified by the user identification information inputted in the user identification information input portion; and processing the image data extracted by the data extracting portion based on the data processing method designated in the data processing method designation portion.

According to this aspect, a data processing program product which facilitates destination designation of data while allowing the data to be obtained by a processing method desired by a user of a destination can be provided.

According to a still further aspect of the present invention, an image data processing program for an image data processing apparatus includes the steps of storing user data including user identification information for identifying each user; in inputting image data, accepting an input of image data; associating the image data with the user identification information stored in the user data storage portion; designating a user identified by the user identification information as a destination; in outputting image data, designating a data processing method for the image data, wherein the data processing method is designated by the user designated as the destination; accepting an input of user identification information; extracting image data for the user specified by the user identification information inputted in the user identification information input portion; and processing the image data extracted by the data extracting portion based on the data processing method designated in the data processing method designation portion.

According to this aspect, a data processing program product which allows data to be obtained by a processing method desired by a user of a destination can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4F are diagrams for describing registered user information and first and second user data.

FIG. 8 is a diagram showing an example of a format of job attribute information.

FIG. 9 is a diagram showing an example of a processing method designation window.

FIG. 11 is a diagram showing an example of job attribute information used in an image processing system according to a modification of processing method designation.

FIGS. 14A and 14B are flow charts showing a flow of a home terminal detection process.

FIGS. 16A and 16B are diagrams for describing first and second user data according to a third embodiment.

FIG. 18 is a diagram showing an example of a format of job attribute information according to the third embodiment.

DESCRIPTION OF THE PREFERRED EMBODIMENTS

Figure 1:
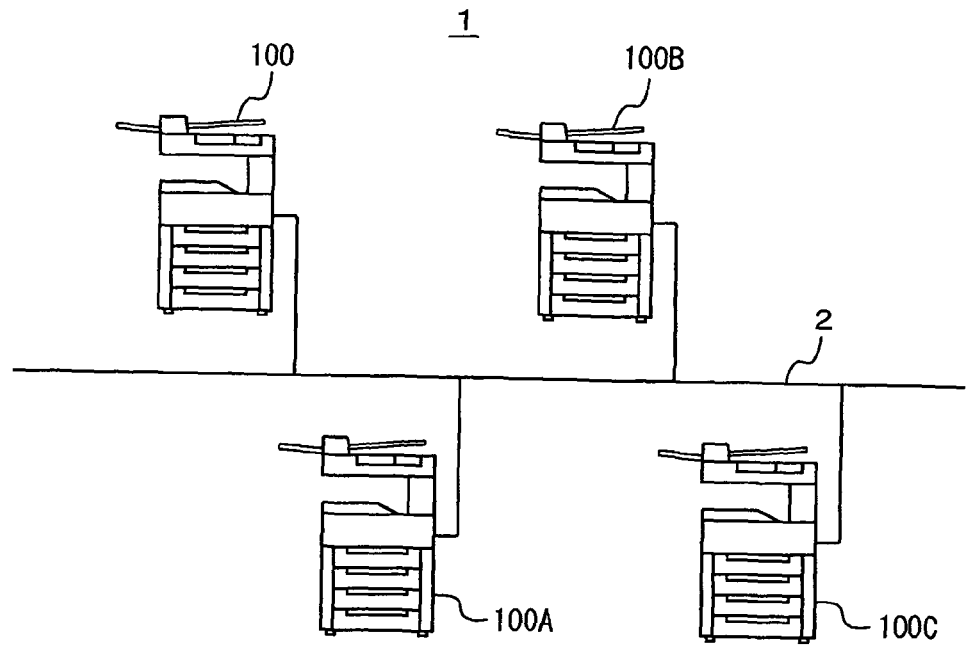
FIG. 1 is an overall schematic diagram of an image processing system according to a first embodiment of the present invention.

The embodiments of the present invention will be described below with reference to the drawings. In the following description, the same or corresponding parts are denoted by the same reference characters. Their names and function are also the same. Thus, a detailed description thereof will not be repeated.

First Embodiment

FIG. 1 is an overall schematic diagram showing an image processing system according to the first embodiment of the present invention. With reference to FIG. 1, an image processing system 1 includes multi function peripherals (referred to as "MFP" below) 100, 100A, 100B, and 100C, each connected to a network 2. The arrangement and the function of MFP 100, 100A, 100B, and 100C are the same so that MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in the this embodiment, MFP 100 can be replaced by an apparatus having a function for processing an image, for instance, a scanner, an image forming apparatus, a facsimile, a personal computer for generating image data, and the like.

Network 2 is a local area network (LAN) and the form of connection can be fixed-line or wireless. In addition, network 2 is not limited to a IAN and can be a wide area network (WAN) such as the Internet, a network using general public lines, and so on.

Figure 2:
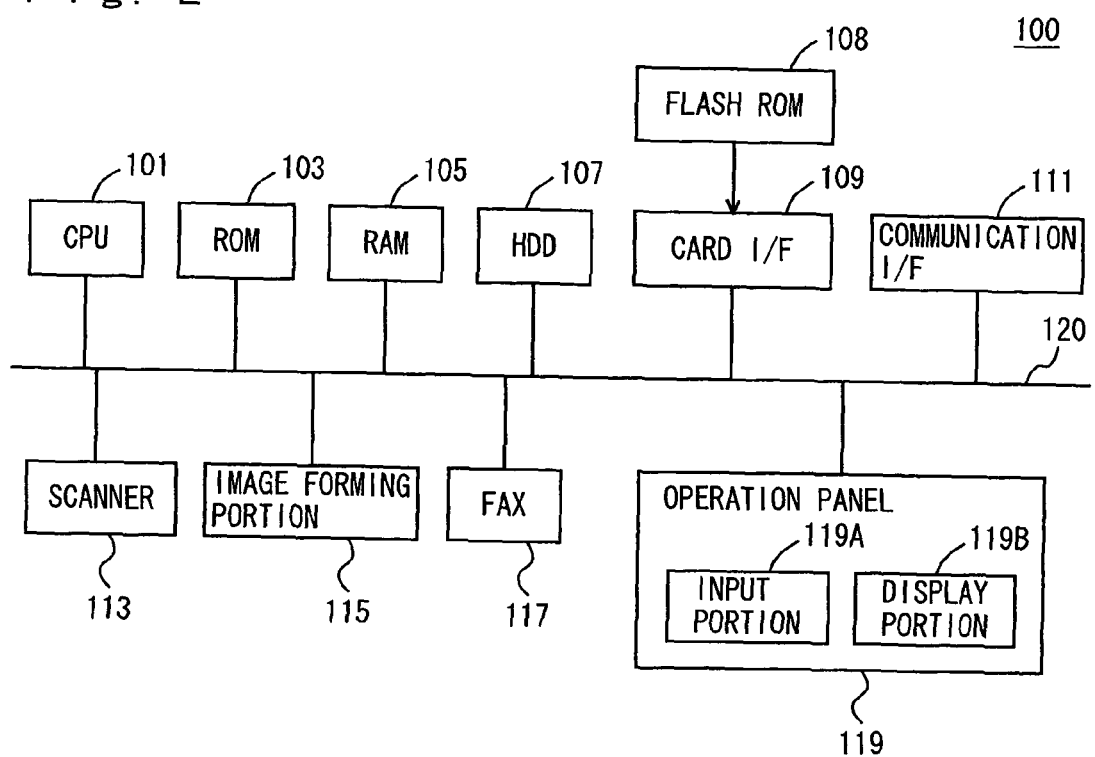
FIG. 2 is a block diagram showing a hardware arrangement of an MFP according to the first embodiment.

FIG. 2 is a block diagram showing a hardware arrangement of MFP 100 according to this embodiment. With reference to FIG. 2, MFP 100 includes, respectively connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation panel 119 as an interface with a user.

CPU 101 loads into RAM 105 and executes a data processing program stored in flash ROM 108 attached to card I/F 109. Moreover, the program executed by CPU 101 is not limited to the data processing program stored in flash ROM 108, and a program stored in ROM 103 or a program stored in an EEPROM (Electrically Erasable/Programmable Read Only Memory) connected additionally to CPU 101 can be loaded into RAM 105 and be executed. The use of an EEPROM makes it possible to rewrite or additionally write a data processing program. Thus, a computer connected to network 2 can rewrite the data processing program stored in the EEPROM of MFP 100 or additionally write a new data processing program into the EEPROM. Furthermore, MFP 100 can download a data processing program from a computer connected to network 2 and store the data processing program in an EEPROM.

The program referred to here not only includes a program directly executable by CPU 101, but also a program in a source program format, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via a public telephone line.

Operation panel 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided overlapping display portion 119B so that an instruction of a button displayed on display portion 119B can be detected. Thus, input of a variety of operations becomes possible.

Communication I/F 111 is a communication interface for connecting MFP 100 to network 2. Thus, it becomes possible for MFP 100 to communicate with other MFPs 100A, 100B, and 100C. Although MFP 100 is connected to other MFPs 100A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is inputted; (2) when image data is received from a computer or from other MFPs 100A, 100B, and 100C connected to network 2 via communication I/F 111; (3) when image data store in flash ROM 108 is read via card I/F 109; and (4) when facsimile data is received in FAX 117. The data inputted into MFP 100 is given a file name and is temporarily stored in a prescribed area of HDD 107.

The output of data from MFP 100 includes the following cases: when the data stored in HDD 107 is (1) made visible on recording media such as a sheet of paper by image forming portion 115, (2) transmitted to a computer or to other MFPs 100A, 100B, and 100C connected to network 2 via communication I/F 111, (3) stored in flash ROM 108, (4) outputted as facsimile data by FAX 117, and (5) displayed on display portion 119B.

Moreover, storage media that stores a data processing program is not limited to flash ROM 108 and can also be the media that records a program in a fixed manner, such as a flexible disk, a cassette tape, an optical disk [MO (Magnetic Optical Disc)/MD (Mini Disc)/DVD (Digital Versatile Disc)], an IC card (including a memory card), an optical card, and a semiconductor memory such as a masked ROM, an EPROM, an EEPROM, and the like.

In the image processing system according to this embodiment, with each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Here, the case in which MFP 100 is connected anew to network 2 where MFPs 100A, 100B, and 100C are already connected thereto is considered. For MFP 100, it is necessary to set apparatus identification information for identifying MFP 100 and the above-described registered user information. When the apparatus identification information and the registered user information are set for MFP 100, MFP 100 transmits the apparatus identification information and the registered user information to other MFPs 100A, 100B, and 100C. Thus, an image processing system is constructed among MFPs 100, 100A, 100B, and 100C.

Figure 3A:
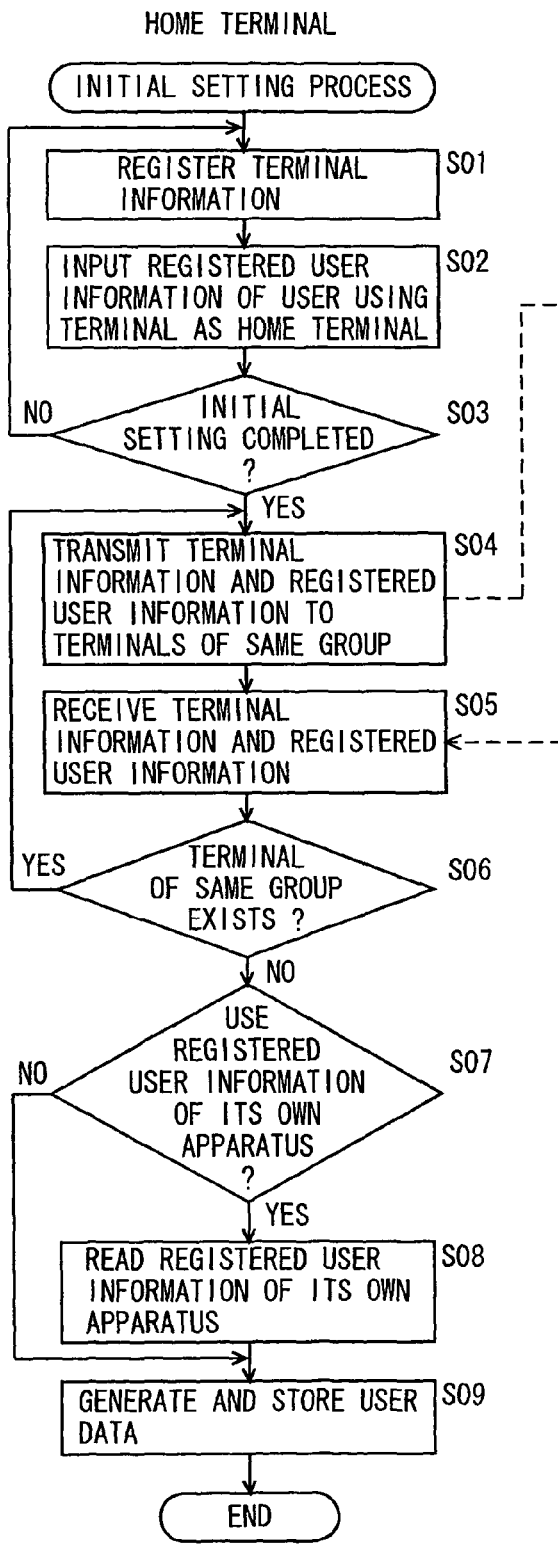
FIGS. 3A and 3B are flow charts showing a flow of a process executed when an MFP is newly connected to a network.
Figure 3B:
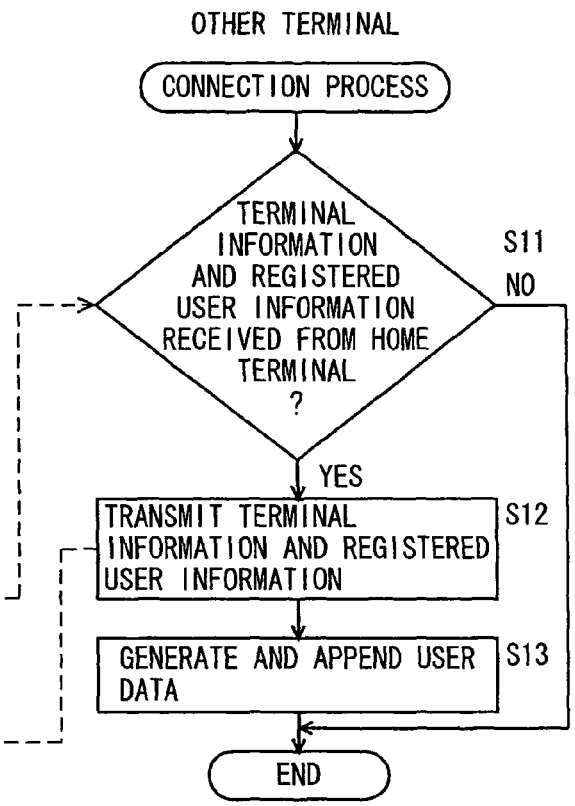

FIGS. 3A and 3B are flow charts showing a flow of a process executed when MFP 100 is newly connected to a network. FIG. 3A shows a flow of an initial setting process executed in MFP 100, and FIG. 3B shows a flow of connection process executed in each of MFPs 100A, 100B, and 100C when the initial setting process is executed in MFP 100. The initial setting process and the connection process are implemented by having an initial setting program that is stored in flash ROM 108 loaded into RAM 105 and executed by CPU 101 in each of MFPs 100, 100A, 100B, and 100C. An initial setting program and a connection program are a part of the data processing program. Moreover, this embodiment is not limited to the example in which CPU 101 reads these programs from flash ROM 108 and executes them. CPU 101 can read and execute a program stored in ROM 103, or a program read from flash ROM 108 can be stored in an EEPROM connected to CPU 101 and that program can then be read and executed. Furthermore, by saving a data processing program stored in flash ROM 108 into HDD 107 first, the program can be loaded from HDD 107 into RAM 105 and be executed.

With reference to FIG. 3A, terminal information is registered in MFP 100 (step S01). The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed.

Next, registered user information of a user who uses MFP 100 as a home terminal is inputted into MFP 100 (step S02). When a plurality of users uses MFP 100 as a home terminal, registered user information of each of the plurality of users is inputted. The registered user information at least includes user identification information for identifying the user. The user identification information needs only to be unique information such as a user ID including characters or symbols and a name of the user. Here, a user name is used as the user identification information. The registered user information can also include accompanying information and authentication information in addition to the user identification information.

The registration of the terminal information in step S01 and the input of the registered user information in step S02 are performed by an operation of operation panel 119 by a user. More specifically, a terminal information input window and a registered user information input window are displayed on display portion 119B, and the user operates input portion 119A and inputs the terminal information and the registered user information according to these windows. Upon completing the input of the respective information, the user instructs on a finish button displayed on display portion 119B with input portion 119A so that the completion of the initial setting is detected in MFP 100. Moreover, the registration of the terminal information in step S01 and the input of the registered user information in step S02 are normally performed by an administrator of the terminal.

Then, it is determined whether the initial setting is completed or not (step S03). If the initial setting is completed, the process proceeds to step S04, and if it is not completed, the process goes back to step S01. In step S04, the terminal information and the registered user information for which initial setting is already performed are transmitted to the terminals in the same group. The same group refers to the set of terminals which form the image processing system. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the IP addresses of MFPs 100A, 100B, and 100C connected to network 2 and detects MFPs 100A, 100B, and 100C, and the user designates which of MFPs 100A, 100B, and 100C should be in the same group as MFP 100.

Here, terminal information and registered user information are transmitted to one terminal chosen from MFPs 100A, 100B, and 100C set as the same group. An example is described in which MFP 100A is selected, and the terminal information and the registered user information of MFP 100 are transmitted from MFP 100 to MFP 100A.

Now, with reference to FIG. 3B, MFP 100A receives the terminal information and the registered user information of MFP 100 transmitted from MFP 100 (step S11). In response to this reception, MFP 100A transmits to MFP 100 the terminal information and the registered user information stored in HDD 107 of MFP 100A (step S12). Moreover, while MFP 100 executes step S04 and transmits the terminal information and the registered user information, this transmission is a request made to MFP 100A for transmission of the terminal information and the registered user information stored in MFP 100A. Instead of transmitting the terminal information and the registered user information in step S04, MFP 100 can transmit to MFP 100A a signal requesting the transmission of the terminal information and the registered user information which MFP 100A stores in its HDD 107. In this case, MFP 100A receives the signal requesting the transmission of the terminal information and the registered user information in step S11, and in response, transmits to MFP 100 the terminal information and the registered user information which MFP 100A stores in HDD 107 (step S12).

Going back to FIG. 3A, MFP 100 receives the terminal information and the registered user information of MFP 100A transmitted from MFP 100A (step S05). Then, it is determined whether a terminal to which the terminal information and the registered user information have not yet been transmitted exists among the terminals of the same group or not (step S06). If such a terminal exists, that terminal is selected and the process goes back to step S04, but if not, the process proceeds to step S07. Here, since the terminal information and the registered user information are not yet transmitted to MFPs 100B and 100C, either of these two is selected and the process goes back to step S04. Thus, MFP 100 transmits the terminal information and the registered user information of MFP 100 to the terminals of the same group one by one (step S04), and receives from each terminal the terminal information and the registered user information of that terminal (step S05). Moreover, although, here, the terminals of the same group are selected one by one and the terminal information and the registered user information are transmitted accordingly, the terminal information and the registered user information can be transmitted by broadcast, and the terminal information and the registered user information stored in MFPs 100A, 100B, and 100C can be received from MFPs 100A, 100B, and 100C, respectively.

From step S07 onward, user data is generated from the terminal information and the registered user information received from all of terminals MFPs 100A, 100B, and 100C of the same group. In step S07, it is determined whether the registered user information of its own apparatus, i.e., MFP 100 itself, is to be used for the user data generation or not. This determination can be based on a selection made by a user, or it can be predetermined. If the registered user information of MFP 100 itself is to be used, the process proceeds to step S08, and if it is not to be used, step S08 is skipped and the process proceeds to step S09. In step S08, the registered user information stored in MFP 100 is read. Then, in step S09, the user data is generated from the terminal information and the registered user information. The user data includes the terminal information and the registered user information. Moreover, although the user data includes the terminal information and the registered user information in this embodiment, the user data needs only to include at least the registered user information. As for the generated user data, if it is determined in step S07 that the registered user information of MFP 100 itself is to be used, all of the terminal information and the registered user information of MFPs 100, 100A, 100B, and 100C put together becomes the user data (first user data), and if it is determined in step S07 that the registered user information of MFP 100 itself is not to be used, all of the terminal information and the registered user information of MFPs 100A, 100B, and 100C but not of MFP 100 put together becomes the user data (second user data). Then, the generated user data is stored in HDD 107.

With reference to FIG. 3B, each of MFPs 100A, 100B, and 100C receives the terminal information and the registered user information of MFP 100 transmitted from MFP 100 (step S11). In response to this reception, MFPs 100A, 100B, and 100C transmit the terminal information and the registered user information of MFPs 100A, 100B, and 100C, respectively, to MFP 100 (step S12). Thus, the connection process is a process executed on the condition that a request is received from MFP 100 which executes the initial setting process. Here, the request is the transmission of the terminal information and the registered user information; however, the request is not limited to this transmission, and it can also be a connection request or the like from MFP 100 that executes the initial setting process.

In the next step, S13, user data is generated from the terminal information and the registered user information of MFP 100 received in step S11, and the generated user data is appended to the user data already stored in HDD 107.

Thus, when the first user data is generated in all of MFPs 100, 100A, 100B, and 100C, the stored user data in all of MFPs 100, 100A, 100B, and 100C become identical. On the other hand, when the second user data is generated in MFP 100A, that second user data would be all of the terminal information and the registered user information of MFPs 100, 100B, and 100C put together, and when the second user data is generated in MFP 100B, that second user data would be all of the terminal information and the registered user information of MFPs 100, 100A, and 100C put together, and when the second user data is generated in MFP 100C, that second user data would be all of the terminal information and the registered user information of MFPs 100, 100A, and 100B put together.

Moreover, here, while the registration of the terminal information and the input of the registered user information are performed in the initial setting process executed in MFP 100, a process similar to this initial setting process is executed in the case where MFP 100 is already connected to network 2 and a user is to be added. In such a case, however, the registration process of the terminal information of step S01 is not required.

In addition, the initial setting process can be performed not only when MFPs 100, 100A, 100B, and 100C are connected to network 2 but also after the power is turned on for MFPs 100, 100A, 100B, and 100C, or at prescribed time intervals. It is performed, for instance, to allow MFP 100 to obtain the registered user information of a user newly registered in other MFPs 100A, 100B, and 100C and to store the latest user data. In this case, instead of the process of steps S01 to S03 of the initial setting process shown in FIG. 3A, a request for transmission of the registered user information is made to other MFPs 100A, 100B, and 100C. This transmission request for the registered user information at least includes apparatus identification information. In response to this transmission request, other MFPs 100A, 100B, and 100C execute the connection process shown in FIG. 3B, and in step S11 in response to the transmission request received, transmit the registered user information stored in their respective HDDs 107 to MFP 100 that transmitted the transmission request. Thus, even when the registered user information stored in HDDs 107 of other MFPs 100A, 100B, and 100C is altered, user data will be generated from the altered registered user information and stored in HDD 107. Moreover, there is no need to execute step S13 in the connection process.

FIGS. 4A to 4F are diagrams for describing the registered user information and the first and second user data. FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C. The registered user information includes user identification information, accompanying information, and authentication information. The accompanying information is the information related to a user, such as the name of the division the user belongs to, an electronic mail address assigned to that user, face image data obtained by capturing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used. Furthermore, FIG. 4E is a diagram showing an example of first user data, and FIG. 4F is a diagram showing an example of second user data stored in MFP 100A. The user data includes a number, registered user information, apparatus identification information of a home terminal, and the location where the home terminal is disposed. The user data need only to include at least the user identification information and the apparatus identification information of a home terminal.

Although an example in which the electronic mail address assigned to a user is saved as accompanying information is illustrated in the above-described embodiment, the method of transmission and reception of image data is not limited to the use of electronic mail, and a facsimile transmission, an FTP (File Transfer Protocol), or the like can be used. In such cases, information suited for the method of transmission and reception of the image data would be saved.

In this manner, when the initial setting process is executed in MFP 100, in MFPs 100, 100A, 100B, and 100C set to be of the same group, the same first user data is generated and stored, or second user data including all of the registered user information of other terminals of the same group is generated. Thus, image processing system 1 constructed by MFPs 100, 100A, 100B, and 100C is formed. When image processing system 1 is formed, the user who uses one of MFPs 100, 100A, 100B, and 100C as a home terminal can be specified based on the user data so that data transmission and reception among users can be performed using the user data. The process executed by MFPs 100, 100A, 100B, and 100C for such data transmission and reception is herein referred to as a job. Moreover, the data transmission and reception performed by execution of such a job is called BOX transmission and reception.

A user inputs a job at one of MFPs 100, 100A, 100B, and 100C in order to transmit data. Moreover, when a job whose destination is the user himself exists, the user instructs MFPs 100, 100A, 100B, and 100C to execute the job and thus to output the data. Hereinafter, MFPs 100, 100A, 100B, and 100C into which a job is inputted is referred to as job input terminals, and MFPs 100, 100A, 100B, and 100C from which a job is outputted is referred to as job output terminals. Here, to simplify the description, the example will be illustrated in which the user of user identification information "David" inputs at MFP 100 the job of transmitting image data to the destination of user identification information "Julie." In this case, MFP 100 is a job input terminal and executes a job input process. MFP 100 that executes the job input process executes the process of authenticating the user in response to a log-in request by the user "David," and thereafter executes a job setting process. Moreover, although the example of executing the job input process at a home terminal is described here, the job input process can also be executed at a terminal other than the home terminal.

Figure 5:
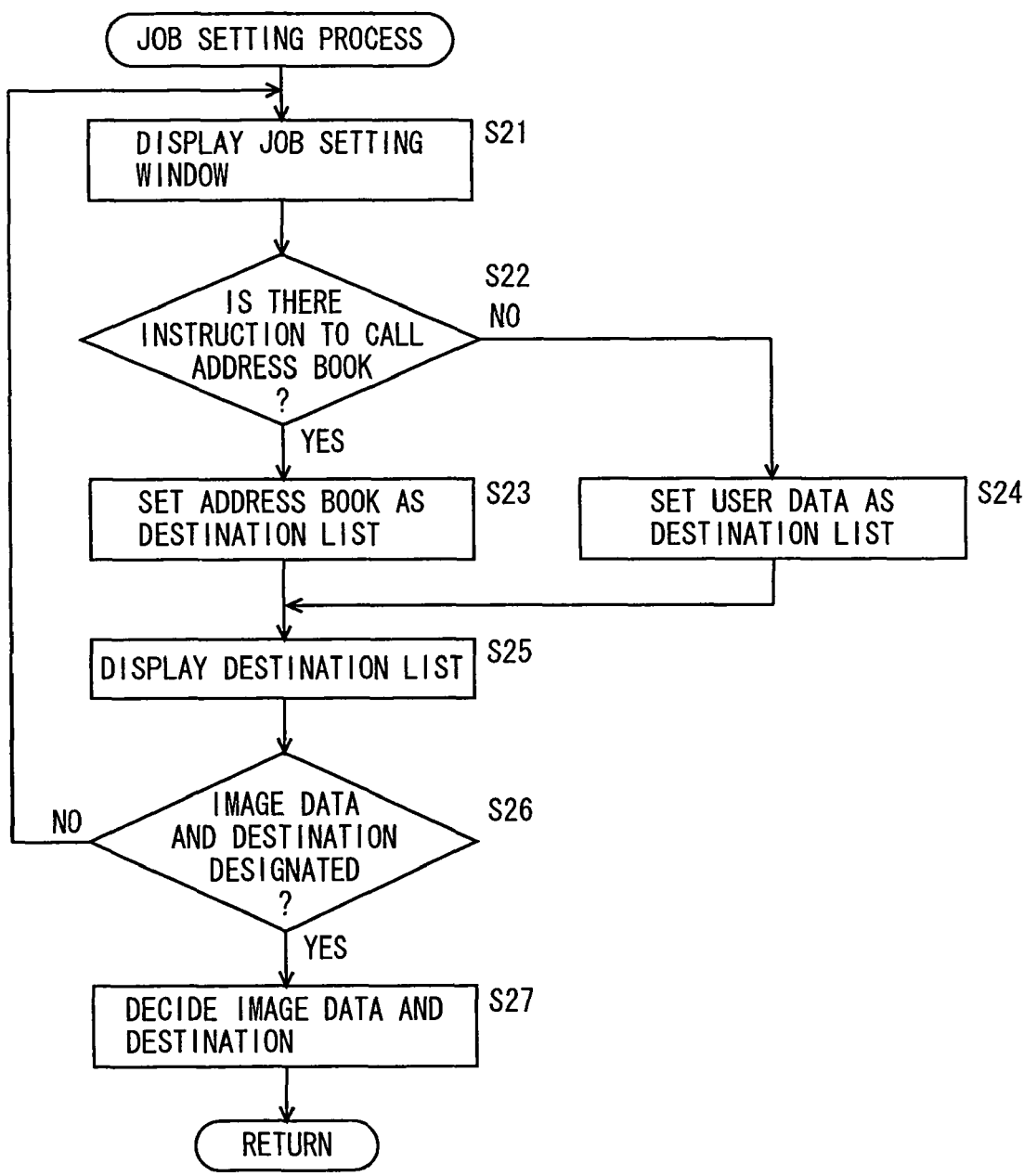
FIG. 5 is a flow chart showing a flow of a job setting process.

FIG. 5 is a flow chart showing a flow of the job setting process. The job setting process is implemented by having a job setting program that is stored in flash ROM 108 loaded into RAM 105 of MFP 100 and executed by CPU 101. The job setting program is a part of a data processing program. Moreover, it is prerequisite that the user "David" is logged into MFP 100 prior to the execution of the job setting program. This is to allow MFP 100 to specify the user who operates it.

With reference to FIG. 5, in the job setting process, a job setting window is displayed on display portion 119B (step S21). The job setting window is a window for setting data to be transmitted, a destination of the transmission, and a method of transmission. Moreover, the method of transmission (communication protocol such as electronic mail and facsimile communication) can be designated on the side where the image data is received. The job setting window will be described later. Then, it is determined whether a call instruction to call an address book is inputted or not (step S22). If a call instruction is inputted, the process proceeds to step S23, and if it is been inputted, the process proceeds to step S24. The address book is unique data of the user that is stored in advance in association with the log-in user, or here, with the user identification information "David." The address book at least includes user identification information and apparatus identification information of a home terminal of that user. The address book can include an electronic mail address. Further, the address book can include a facsimile number. In step S23, the address book is read and is set as a destination list. In step S24, user data is read, and the user data is set as the destination list. In this case, it is not required to generate the destination list anew, and the destination list can be displayed even when an address book does not exist. Then, the destination list is displayed on the job setting window (step S25).

Further, it is determined whether or not the image data to be transmitted and the destination are designated in the job setting window (step S26), and if they are designated, the process proceeds to step S27, and if not, the process goes back to step S21. In step S27, the image data and the destination designated in step S26 are decided to be the image data to be transmitted and the destination.

Figures 6A, 6B:
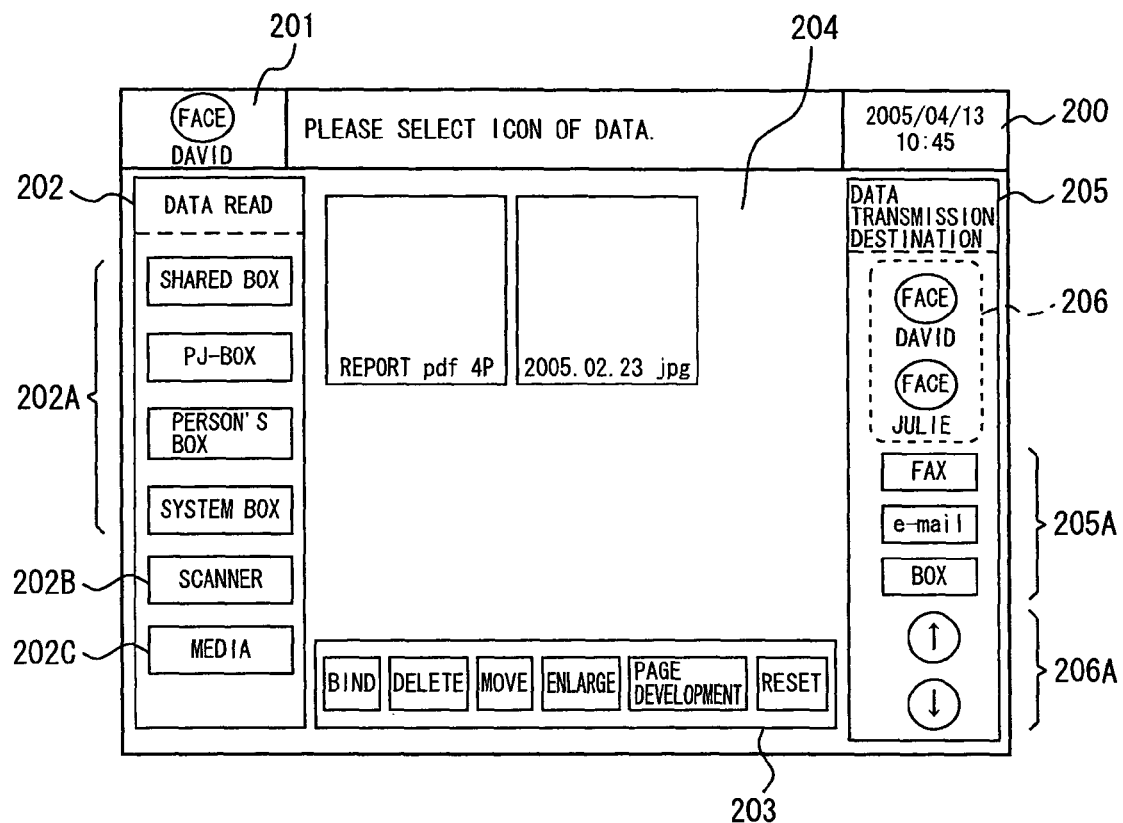
FIG. 6A is a diagram illustrating an example of a job setting window.
FIG. 6B is a diagram illustrating an example of a sub-window showing detailed information of a user.

FIG. 6A is a diagram illustrating an example of the job setting window. With reference to FIG. 6A, a job setting window 200 includes an area 201 for displaying information specifying an operator, an area 202 for accepting an input instruction or a selection instruction of data to be transmitted, an area 203 for instructing edition of data inputted or selected in area 202, an area 204 for accepting designation of the image data to be transmitted, and an area 205 for accepting designation of the destination of the transmission and the method of transmission.

In area 201, as the information to specify the log-in user "David" who is the operator, the user name "David" as the user identification information and the face image of David are displayed. Moreover, although the characters "FACE" are shown in the diagram for convenience, in practice the face image will be displayed.

Area 202 includes a button 202A for designating an area of HDD 107, a button 202B for instructing input of image data from scanner 113, and a button 202C for instructing input of image data from an image data input device. When button 202A is instructed, a thumbnail that displays in reduction the image data stored in the area of HDD 107 corresponding to that button is displayed in area 204. When button 202B is instructed, scanner 113 is activated and the thumbnail of image data outputted by scanner 113 is displayed in area 204. When button 202C is instructed, image data from the image data input device is inputted, and the thumbnail of the inputted image data is displayed in area 204. The image data input device is, for instance, a computer connected to network 2, and the image data outputted from that computer is inputted.

By instructing on the thumbnail displayed in area 204, the image data corresponding to the instructed thumbnail is designated as the image data to be the object of transmission. In addition, when the button displayed in area 203 is instructed, such processes as a bind process of putting together a plurality of image data, a deletion process of deleting the image data from the object of selection, a move process for changing the order, a process of enlarging the image data, a page development process of putting together a plurality of image data into one image data, and a reset process of canceling the instructed process are executed using the image data designated in area 204.

Area 205 is an area for setting a destination of transmission and a method of transmission. Area 205 includes an area 206 that displays a destination list for designating the destination of transmission, a button 205A for designating the method of transmission, and a button 206A for scrolling the display of the destination list. As a method of transmission, a facsimile transmission, an electronic mail (E-mail) transmission, or BOX transmission and reception can be designated. At least a part of the destination list is displayed in area 206. As the destination list, either of the address book or the user data is set by the above-described job setting process. The destination list at least includes the user identification information. Thus, the user identification information is displayed in area 206. Moreover, when the destination list includes a face image as accompanying information, that face image is displayed adjacent to the user identification information. Here, although two of the destinations included in the destination list are displayed in area 206, it can be changed to display another destination by instructing on button 206A.

Furthermore, by instructing on the user identification information displayed in area 206, detailed information of the user is displayed in a sub-window. The sub-window is displayed on the job setting window in an overlapping manner. The information displayed in the sub-window includes at least a part of the user data. FIG. 6B is a diagram illustrating an example of the sub-window showing the detailed information of a user. With reference to FIG. 6B, all of the user data of the user identification information "David" is displayed.

[BOX Transmission and Reception]

In the image processing system according to this embodiment, the above-described job setting process is executed when a job input process is executed at a job input terminal. Then, a job management process is executed in a home terminal of the user of the destination set by the job setting process. Here, the user of the user identification information "David" transmits image data to the destination of user identification information "Julie" at a home terminal MFP 100 so that the job input process is executed in MFP 100 and the job management process is executed in MFP 100A which is a home terminal of the user identification information "Julie." Furthermore, when "Julie" who is set to be the user of the destination instructs output of the job at home terminal MFP 100A or at other terminals MFPs 100, 100B, and 100C, a job output process is executed at that terminal. The terminal at which the output of a job is instructed is called a job output terminal. Here, the job output terminal is described as being MFP 100B.

Figure 7A:
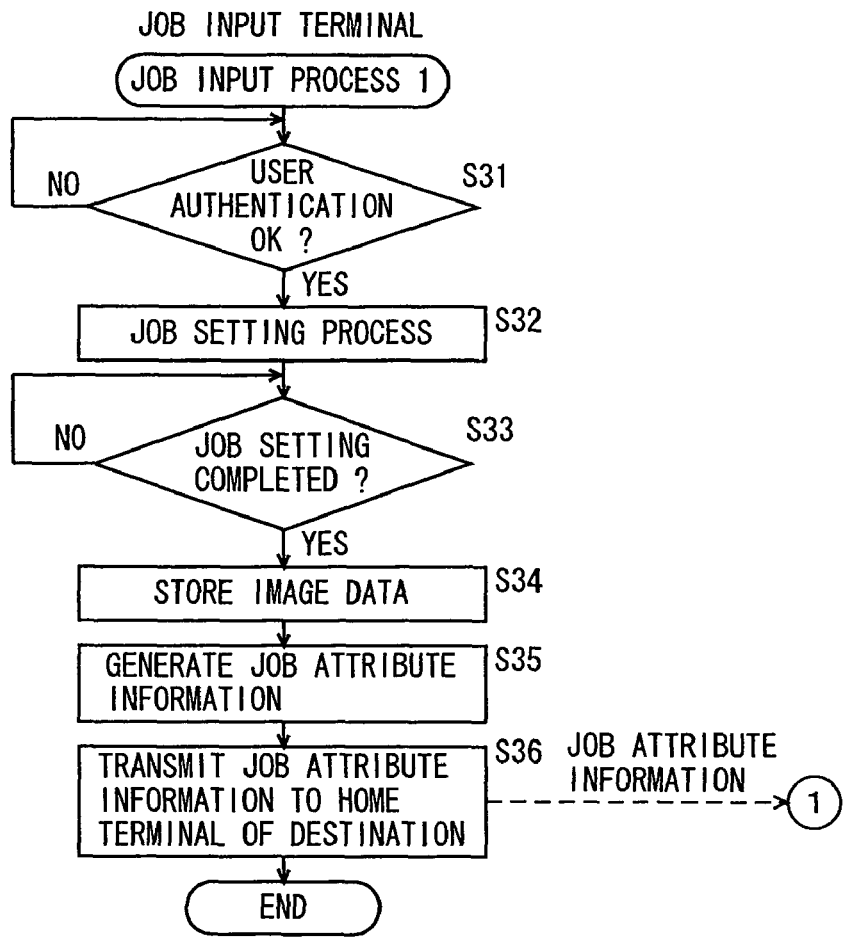
FIGS. 7A to 7D are flow charts showing a flow of a BOX transmission and reception process executed in the image processing system according to the first embodiment.
Figure 7B:
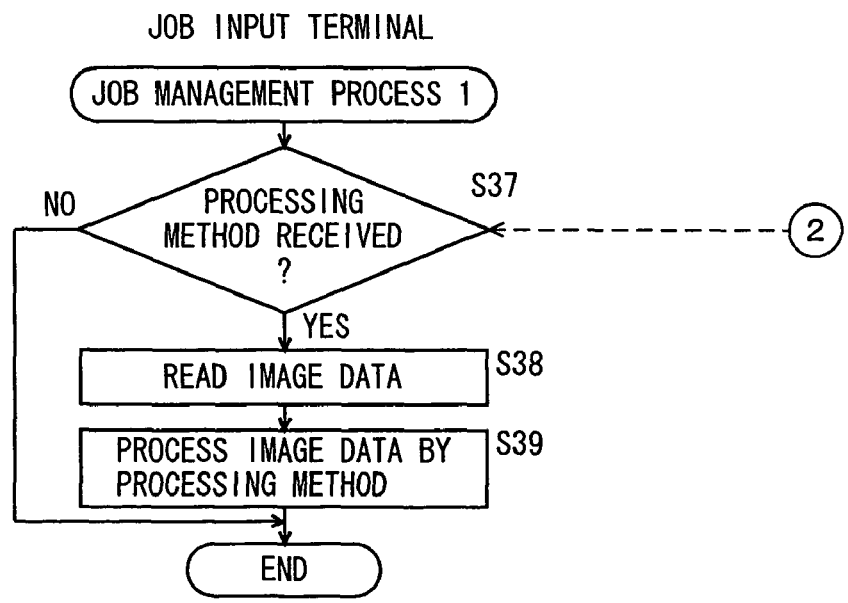
Figure 7C:
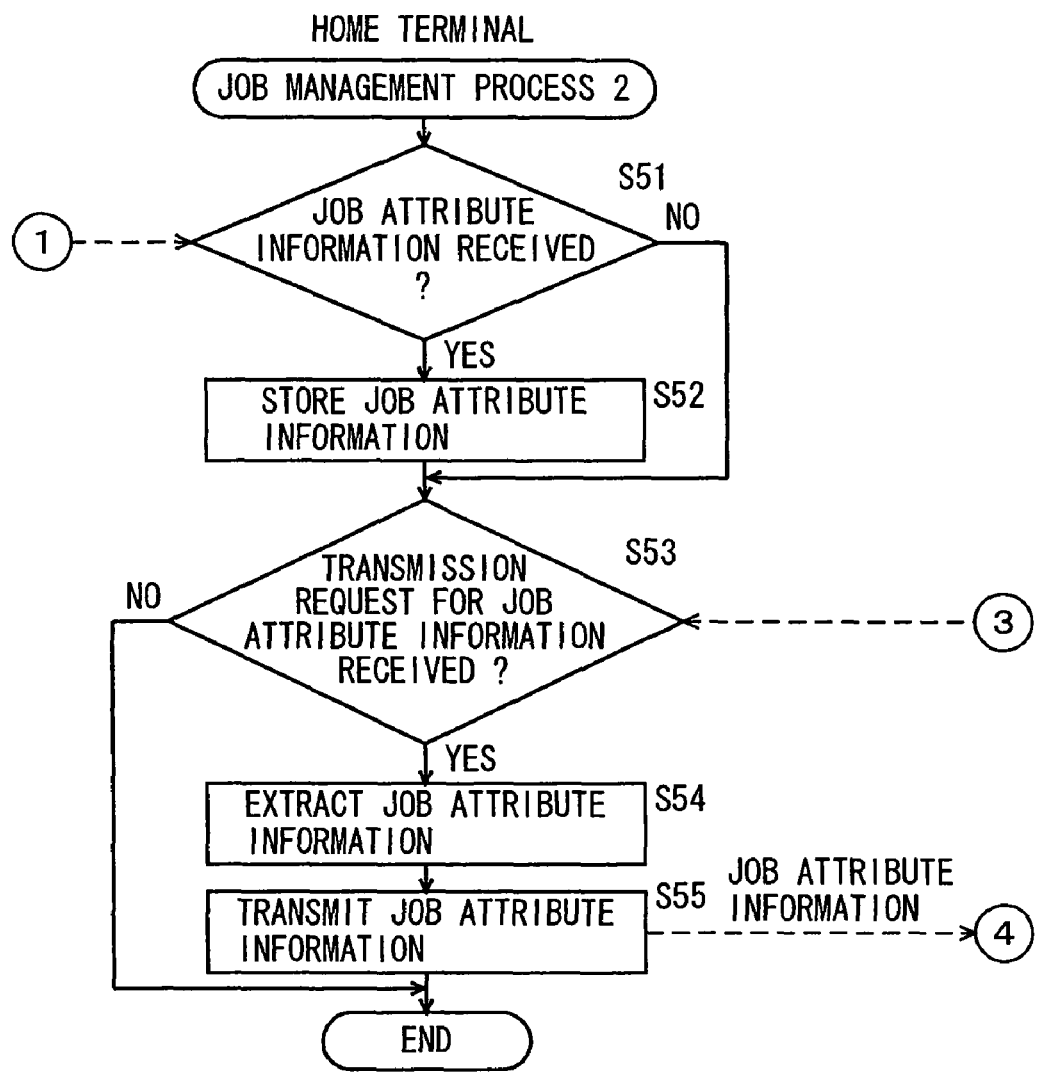
Figure 7D:
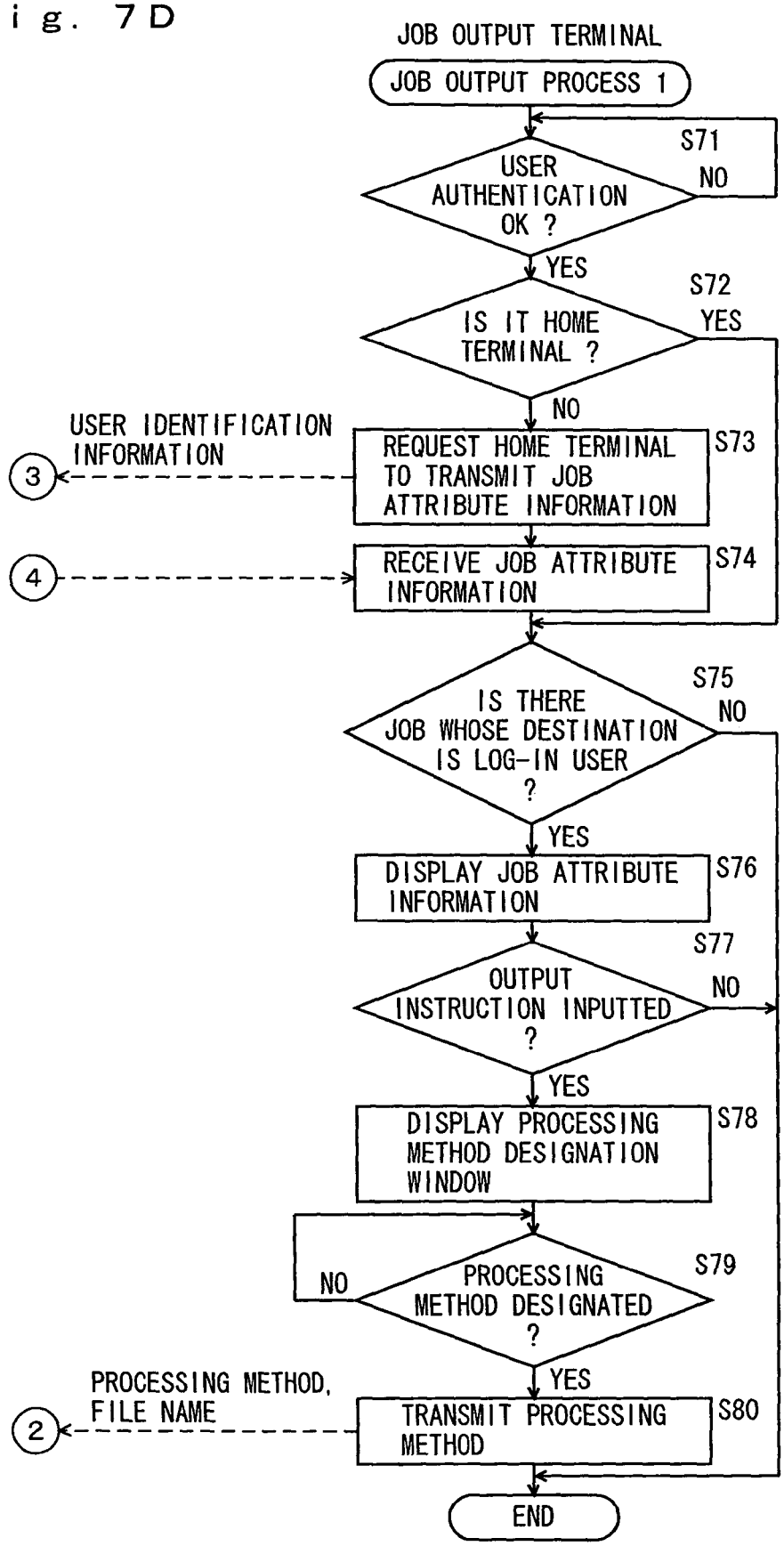

FIGS. 7A to 7D are flow charts showing a flow of a BOX transmission and reception process executed in the image processing system according to this embodiment. FIG. 7A is a flow chart showing a flow of a job input process executed at a job input terminal. FIG. 7B is a flow chart showing a flow of a job management process executed at the job input terminal. The job input process and the job management process are implemented by loading a job input program stored in flash ROM 108 into RAM 105 of the job input terminal and executing the job input program by CPU 101. FIG. 7C is a flow chart showing a flow of a job management process executed at a home terminal. This job management process is implemented by loading a job management program stored in flash ROM 108 into RAM 105 of the home terminal and executing the job management program by CPU 101. FIG. 7D is a flow chart showing a flow of a job output process executed at a job output terminal. This job output process is implemented by loading a job output program stored in flash ROM 108 into RAM 105 of the job output terminal and executing the job output program by CPU 101. The job input program, the job management program, and the job output program are a part of a data processing program.

First, with reference to FIG. 7A, MFP 100 which is the job input terminal performs user authentication of the user of user identification information "David" (step S31). As a result of the user authentication, if the user is authenticated, log-in is permitted and the process proceeds to step S32, but if not authenticated, log-in is not permitted and the process goes back to step S31 and stands by. The authentication involves permitting log-in when the user identification information and a password inputted by the user exist in the user data stored in HDD 107 and not permitting log-in when they do not exist. As described above, the user data includes registered user information stored in MFPs 100A, 100B, and 100C but not in MFP 100 so that a user for whom MFP 100 is not a home terminal can log into MFP 100 as long as the user uses any of MFPs 100A, 100B, and 100C as a home terminal.

In step S32, the job setting process described using FIG. 5 is executed. Then, it is determined whether the setting of a job is completed or not (step S33). When the setting is completed, the process proceeds to step S34, and if not completed, the process stands by until the setting is completed. The setting of the job is determined to have been completed when image data to be transmitted and the destination are decided by the job setting process.

In step S34, the image data decided to be transmitted is stored in HDD 107. Then, in step S35, job attribute information is generated. The job attribute information is data which associates location information indicating a location of the image data on a network with user identification information of a user which becomes destination information. Then the generated job attribute information is transmitted to MFP 100A which is a home terminal of the user "Julie" of the destination (step S36).

FIG. 8 is a diagram showing an example of a format of job attribute information. With reference to FIG. 8, the job attribute information includes information of transmission origin, destination information, and image data information. The information of transmission origin is user identification information of a user who instructed the execution of the job input process, who is, here, "David." The destination information includes user identification information of the user of the destination and apparatus identification information for identifying a home terminal of that user. Here, the user identification information of the destination information is "Julie" and the apparatus identification information is an IP address of MFP 100A. The image data information includes the apparatus identification information of a terminal in which the image data information is stored and a file name stored in that terminal. Here, the image data is stored in HDD 107 of MFP 100 which is the job input terminal so that the apparatus identification information of the image data information is the IP address of MFP 100 and the file name is designated by a direct path including information which specifies HDD 107 (for instance, a device name or a drive name). Thus, the image data information is the location information on network 2 where the image data is stored, and at least has apparatus identification information (IP address of the apparatus). The image data information can be an URL (Uniform Resource Locator). Moreover, although the image data to be transmitted is here stored in MFP 100 which is the job input terminal, it can be stored in other MFPs 100A, 100B, and 100C.

With reference to FIG. 7C, it is determined whether or not job attribute information is received in MFP 100B which is a home terminal (step S51). If the job attribute information is received, the process proceeds to step S52, and if the job attribute information is not received, the process proceeds to step S53. In step S52, the received job attribute information is stored in a prescribed area of HDD 107.

At this stage, the image data to be transmitted is stored in MFP 100 which is the job input terminal, and the job attribute information is stored in MFP 100A which is a home terminal of the user "Julie" of the destination.

Next, with reference to FIG. 7D, in MFP 100B which is the job output terminal, user authentication of the user of the user identification information "Julie" is performed (step S71). As a result of the user authentication, if the user is authenticated, log-in is permitted and the process proceeds to step S72, but if not authenticated, log-in is not permitted and the process stands by. In other words, a job output process is a process which is executed on the condition that at least user identification information is inputted at the job output terminal. As described above, user data includes registered user information stored in MFPs 100, 100A, and 100C but not in MFP 100B which is the home terminal so that a user for whom MFP 100B is not a home terminal can log into MFP 100B as long as the user uses any of MFPs 100, 100A, and 100C as a home terminal.

Thus, in step S72, it is determined whether MFP 100B which is the job output terminal is a home terminal of the user of the user identification information "Julie" or not. If it is the home terminal, the process proceeds to step S75, but if not, the process proceeds to step S73. Here, MFP 100B is not a home terminal of the user of the user identification information "Julie" so that the process proceeds to step S73. In step S73, a request for transmission of job attribute information is transmitted to MFP 100A which is a home terminal of the user of the user identification information "Julie." This transmission request includes the user identification information "Julie."

With reference to FIG. 7C, in step S53, it is determined whether the transmission request for the job attribute information is received or not. If it is received, the process proceeds to step S54, and if it is not received, the process is ended. In step S54, using the user identification information included in the transmission request, the job attribute information including that user identification information is extracted from the job attribute information stored in HDD 107. In the case where a plurality of corresponding job attribute information exist in HDD 107, all of the corresponding job attribute information is extracted. Then, the extracted job attribute information is transmitted to the job output terminal that transmitted the transmission request (step S55). Moreover, if no corresponding job attribute information is extracted in step S54, information which indicates that the job attribute information does not exist is transmitted to the job output terminal.

With reference to FIG. 7D, job attribute information is received according to the transmission request transmitted in step S73 (step S74). If the information which indicates that the job attribute information does not exist is received, the process proceeds directly to step S75.

In the next step, S75, it is determined whether a job whose destination is the user of the user identification information "Julie" who is the log-in user exists or not. This determination is made based on whether the job attribute information exists or not. If the job output terminal is not a home terminal, the determination is made based on whether the information which indicates that the job attribute information does not exist is received in step S74 or not. If such information is received, the process is ended as having no job. If the job attribute information is received in step S74, the process proceeds to step S76. On the other hand, in the case where the job output terminal is a home terminal, job attribute information which includes the user identification information "Julie" who is the log-in user is extracted from the job attribute information stored in HDD 107. If such job attribute information is extracted, the process proceeds to step S76 as having a job, and if it is not extracted, the process is ended.

In step S76, the job attribute information including the user identification information "Julie" who is the log-in user is displayed on display portion 119B. Of the job attribute information, at least the user identification information of the destination information is displayed. The user identification information of the information of transmission origin and a file name of image data information can also be displayed. This is to allow the user to use as reference and to understand whom the transmitted image data was transmitted from and its content.

Then, it is determined whether an output instruction is inputted or not (step S77). If such an instruction is inputted, the process proceeds to step S78, and if not, the process is ended. When a plurality of job attribute information are displayed, the output instruction can be one to designate all of them, or it can be one to designate a part of them. In step S78, a processing method designation window is displayed. The processing method designation window is a window for designating processing for the image data specified by the file name of the image data information of the job attribute information.

FIG. 9 is a diagram showing an example of a processing method designation window. With reference to FIG. 9, the processing method designation window is displayed to accept an input of a protocol designation, an image processing designation, and a print process designation. A protocol is to designate the method for transmitting the image data, and includes FTP, electronic mail, facsimile (FAX), and printout. In the processing method designation window, the designation of one of the FTP, the electronic mail, the facsimile (FAX), and the printout is accepted. When the FTP is designated, a designation of an IP address is accepted in order to designate the destination of transmission of data. At default, a prescribed area of HDD 107 of a job output terminal is designated. The prescribed area can be a user box of a log-in user. When the electronic mail is designated, a designation of an electronic mail address is accepted in order to designate the destination of the electronic mail. At default, an electronic mail address of the log-in user is set. When a facsimile communication is designated, a designation of a facsimile number is accepted in order to designate the destination of transmission of the facsimile. When the printout is designated, a designation of apparatus identification information is accepted in order to designate the apparatus to perform the printout. At default, the apparatus identification information of the job output terminal is set. Moreover, when the FTP or the electronic mail is designated as the protocol of the processing method, the designation of a compression technology or an image format can also be made possible. The image format refers, for instance, to a PDF (Portable Document Format), a TIFF (Tagged Image File Format), and a bitmap (BMP).

Of the designation of the processing method, the designation of image processing includes an enlargement process, a reduction process, an edge enhancement process, and a smoothing process. Moreover, the image processing is not limited to these processes and can include other processes. The image processing needs only to be an image processing function provided in a job input terminal MFP 100 and/or in a job output terminal. A plurality of processes can be designated for the image processing. Of the designation of the processing method, the designation of the print process becomes possible only when the protocol of the printout described above is designated. The designation of the printout process includes a designation of the distinction between color and black-and-white, a designation of use or nonuse of stapling, a designation of a 2-in-1 print to print two pages on a single sheet of paper, a designation of a double-sided print to print two pages on both sides of a single sheet of paper, and a designation of a dual page print. The print process needs only to be an image processing function provided in job input terminal MFP 100 and/or in a job output terminal.

Going back to FIG. 7D, in step S79, the process stands by until a processing method is designated according to the processing method designation window displayed in step S78 (NO in step S78), and when the processing method is designated, the process proceeds to step S80. In step 80, a designated processing method is transmitted to the terminal specified by the apparatus identification information of the image data information of the job attribute information. Here, the image data is stored in the job input terminal so that the processing method would be transmitted to MFP 100 which is the job input terminal. In order to specify the image data which is to be the object of processing, a file name of the image data information of the job attribute information is transmitted along with the processing method.

With reference to FIG. 7B, in step S37, it is determined whether a processing method is received or not. If the processing method is received, the process proceeds to step S38, and if it is not received, the process is ended. In step S38, the image data specified by the file name received along with the processing method is read. Then, the read image data is processed according to the processing method received (step S39). Thus, if image processing is designated for the processing method, the designated image processing is executed on the read image data. If an enlargement process is designated, the image data is enlarged at a magnification designated by the processing method, if a reduction process is designated, the image data is reduced at a reduction ratio designated by the processing method, if an edge enhancement process is designated, the edge enhancement process is executed, and if a smoothing process is designated, the smoothing process is executed. If the FTP is designated as the protocol of the processing method, the read image data is transmitted to an IP address designated by the processing method according to the protocol of the FTP. If an electronic mail is designated as the protocol of the processing method, an electronic mail is generated with the read image data attached thereto, and the electronic mail is transmitted to an electronic mail address designated by the processing method. When the FTP or the electronic mail is designated as the protocol of the processing method, if a compression technology or an image format is designated, the process of compressing the read image data by the designated compression technology or the process of converting the read image data into the designated image format is executed, and thereafter, the processed image data is transmitted. If a facsimile transmission is designated as the protocol of the processing method, the read image data is transmitted according to the protocol of the facsimile in a communication mode designated by the processing method to a facsimile number designated by the processing method. If a printout is designated as the protocol of the processing method, the read image data and a print instruction are transmitted to an apparatus designated by the processing method and cause the apparatus to perform the printing. If the print process is designated by the processing method, the print instruction includes a command that causes printing according to the print process. More specifically, if the distinction between color and black-and-white is designated, the print instruction includes a command that decides the print mode to either one, and if the use of stapling is designated, it includes a command that causes the stapling to be performed, and if a 2-in-1 print, a double-sided print, or a dual page print is designated, it includes a command that causes the corresponding print to be executed.

In any of these cases, in this embodiment, the designated image data is processed and outputted at a job input terminal based on the processing method designated in step S79, i.e., the processing method received in step S37. Moreover, the processed image data can be outputted from a destination or a terminal (including a job input terminal) designated by the user specified by user identification information, or from a job output terminal at which the user specified by the user identification information gave the instruction of the output. In addition, when the image data is to be output at the job output terminal where the user specified by the user identification information gives the instruction of the processing method, when seen from the perspective of the job output terminal, it means that the image data is obtained from the job input terminal.

The above-described example is not limiting. A job input terminal, once the designated image data is obtained, can process the designated image data based on the processing method designated at a job output terminal, or the designated image data can be transmitted to a designated destination or terminal and be processed by the job output terminal based on the processing method designated at the job output terminal.

Furthermore, information related to a designation of the above processing method and/or information related to a designation of where outputting takes place is not designated every time image data is processed, but is, for instance, saved in a home terminal of the user specified by the user identification information and the image data can be processed or outputted based on this saved information.

Moreover, if a printout is designated as the processing method and if the apparatus designated by the processing method is a job output terminal, or here MFP 100B, without a job input terminal MFP 100 giving a print instruction, image data is transmitted from job input terminal MFP 100 to job output terminal MFP 100B, and the image data is printed at job output terminal MFP 100B according to the print process designated by the processing method.

Moreover, there is a case where a job output terminal is used for both the job output terminal and a job input terminal, and in such a case, the image data is stored in HDD 107 of the job output terminal. Thus, when obtaining such image data, instead of transmitting the processing method in step S80, the job output terminal reads from HDD 107 the image data specified by the file name of the image data information of the job attribute information, and processes the read image data according to the processing method. In this case, step S80 is not required.

[Modification of Processing Method Designation]

In the above-described image processing system, a user at a destination of transmission, when obtaining image data at a job output terminal, designates a processing method for that image data. In an image processing system according to a modification of a processing method designation, a user at a transmission origin designates the processing method. This is because the user of the transmission origin sometimes desires to specify the processing method with which image data should be processed. For instance, if the image data is in color, a printout in color may be desired, and if the image is of a high resolution, transmission of the image data itself by the FTP or electronic mail and not by a facsimile transmission may be desired, while to the contrary, there may be cases where a reception by a facsimile transmission is desired instead of the reception of the image data itself. Thus, the image processing system according to the modification of the processing method designation allows the user of the transmission origin to designate the processing method when generating a job at a job input terminal.

Figures 10A, 10B:
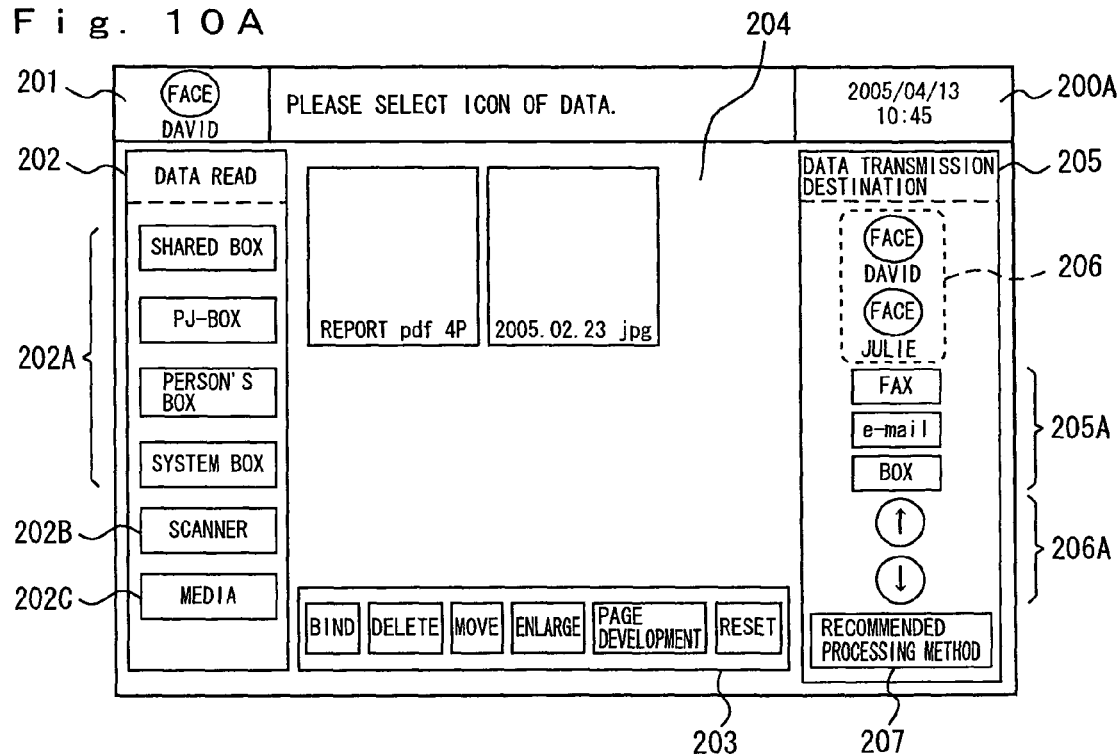
FIGS. 10A and 10B are diagrams showing another example of the job setting window and the processing method designation window.

In job input terminal MFP 100, the job input process shown in FIG. 7A is executed, while in step S32 of the job input process, a job setting window is displayed and a designation of a processing method is accepted. FIG. 10A is a diagram showing an example of the job setting window. A job setting window 200A differs from job setting window 200 shown in FIG. 6A in that a button 207 displaying a letter string of "recommended processing method" is provided in area 205. When button 207 is instructed, a processing method designation window for designating a processing method is displayed. FIG. 10B is a diagram showing an example of the processing method designation window. The processing method designation window shown in FIG. 10B differs from the processing method designation window shown in FIG. 9 in that no space for designating an IP address exists in the protocol of the FTP, that no space for designating an electronic mail address exists in the protocol of the electronic mail, and that no space for designating apparatus identification information exists in the protocol of the printout. This is because, while the user at the transmission origin can designate the protocol, the information related to the transmission destination is unknown to this user. In other respects, the processing method designation window shown in FIG. 10B is the same as the processing method designation window shown in FIG. 9 so that the description thereof will not be repeated here. The user at the transmission origin will be inputting the processing method according to this processing method designation window.

Moreover, when the user to become the destination of transmission of data is designated, the destination of the transmission of the data would be a home terminal of the designated user so that a list of functions provided in the home terminal may be obtained from the home terminal, and it may be set such that, from the list of functions obtained, only the executable processing methods can be designated. This is because the user most frequently executes the job output process at a home terminal. For instance, if a home terminal has no stapling function, it can be made such that the stapling in the print process cannot be designated.

Going back to FIG. 7A, after the processing method is designated in step S32, job attribute information is generated in step S35, and the job attribute information generated here includes the processing method. FIG. 11 is a diagram showing an example of job attribute information used in the image processing system according to the modification of processing method designation. With reference to FIG. 11, the job attribute information of FIG. 11 includes the processing method in addition to the job attribute information shown in FIG. 8. The processing method includes the contents of the protocol, the image processing, and the print process designated by the processing method designation window shown in FIG. 10B. Moreover, information related to this recommended processing method and image data need only to be associated and transmitted so that they can be transmitted separately.

With reference to FIG. 7D, MFP 100B which is a job output terminal receives job attribute information from MFP 100A which is a home terminal (step S74), and this job attribute information includes the processing method designated by the user at the transmission origin. Therefore, in step S78, in the processing method designation window displayed upon designating a processing method, the processing method designated by the user at the transmission origin is displayed as already being designated. When one of the FTP, the electronic mail, and the printout is designated as the protocol, only an IP address, an electronic mail address, or apparatus identification information needs to be inputted, respectively. Thus, the user at the transmission origin can designate the processing method so that it becomes possible to process the image data by the processing method which reflects the intention of the user of the transmission origin. Needless to say, the user receiving the image data may change the processing method at this point.

[Modification of Job Input Process]

In the above-described image processing system, a user registered at any of MFPs 100, 100A, 100B, and 100C inputs image data in any of MFPs 100, 100A, 100B, and 100C. Thus, the image data is inputted inside the image processing system. The modification of the job input process involves a case where the user of the destination of a transmission is designated and the image data is inputted from outside the image processing system. Inputting of image data with the user of the transmission destination designated involves, for instance, providing an area assigned to each user in HDD 107 of job input terminal MFP 100 and associating that area with a command for executing the process of transmitting the image data stored in that area to the user assigned to that area. Here, the example is described in which image data is stored in an area assigned to user identification information "Julie" in HDD 107 of job input terminal MFP 100. Moreover, the input of image data includes such cases as where the image data is received by the FTP, is received by a facsimile, or is read from storage media such as an IC card, and so on. Thus, this modification allows image data inputted by a first method from outside the image processing system and image data inputted by a second method which is different from the first method to be processed by a processing method designated in advance. In this example, a job input process is executed in MFP 100, and a job management process is executed in MFP 100A which is a home terminal of user identification information "Julie." Further, when "Julie" who is set to be the user of the destination instructs the output of a job at MFP 100A which is a home terminal or at other terminals MFPs 100, 100B, and 100C, a job output process is executed at that terminal. Here, the job output terminal will be described as being MFP 100B.

Figure 12A:
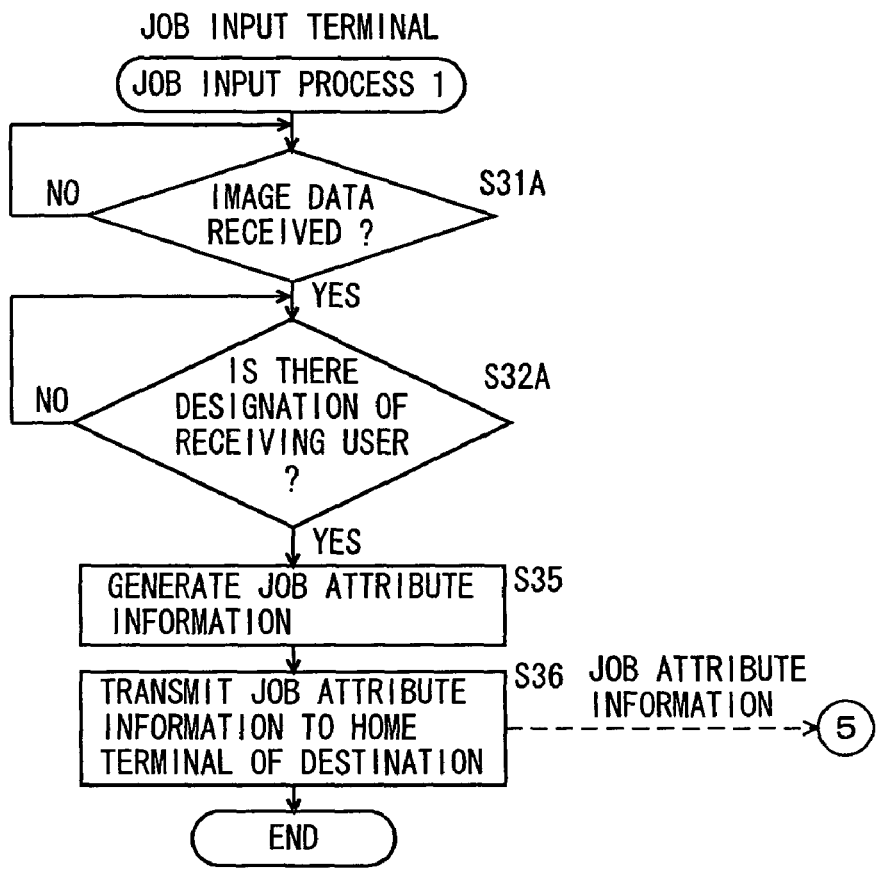
FIGS. 12A to 12D are flow charts showing a flow of a BOX transmission and reception process according to a modification of a job input process.
Figure 12B:
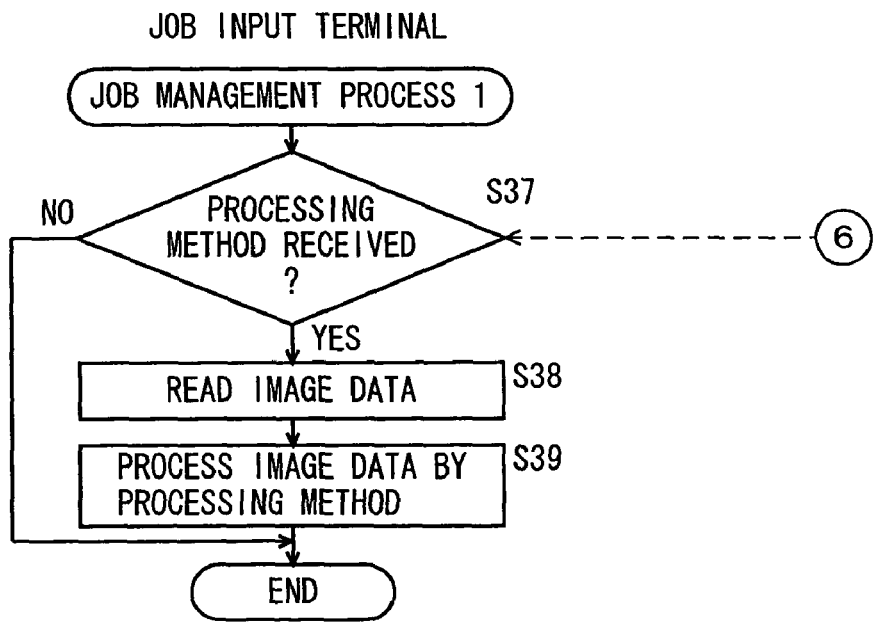
Figure 12C:
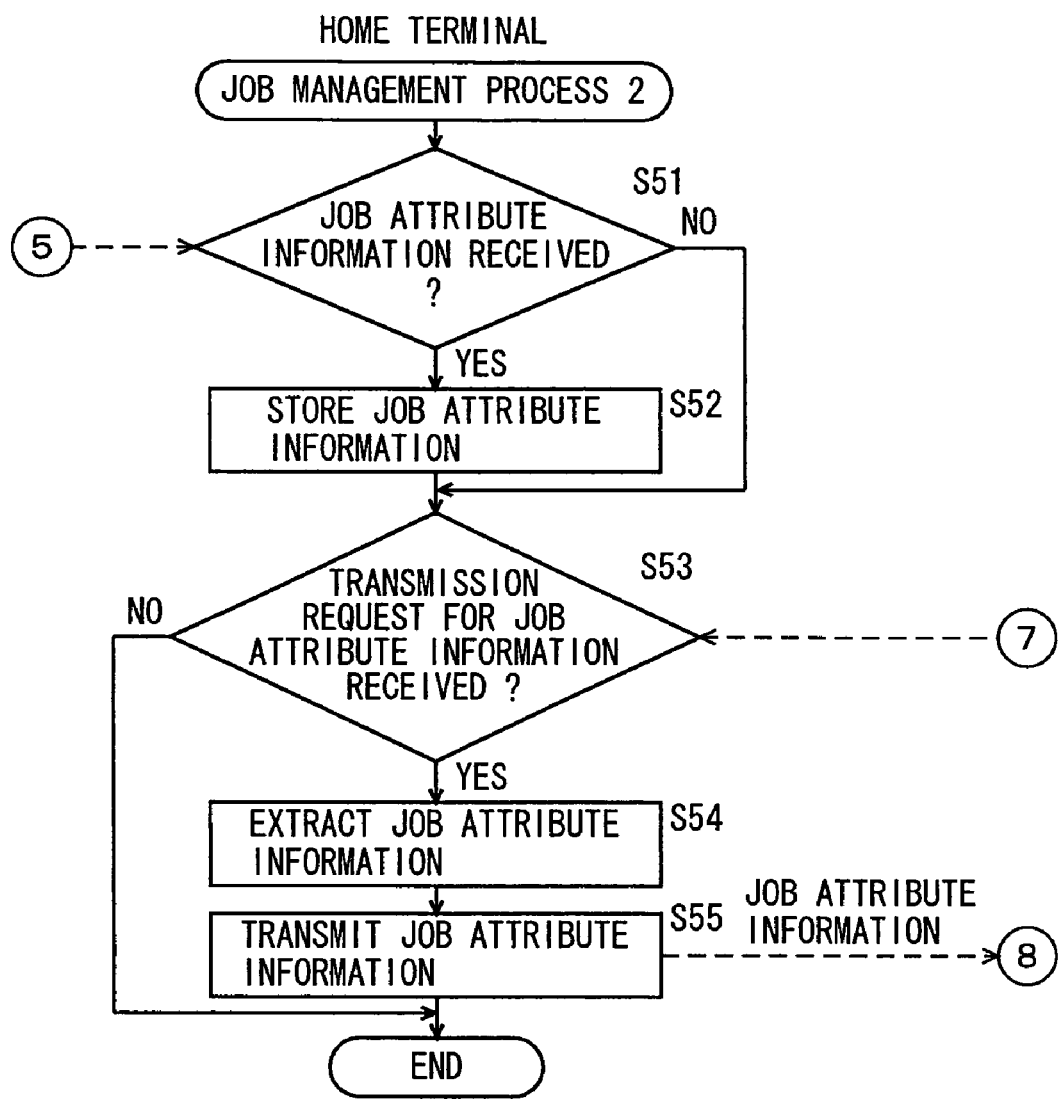
Figure 12D:
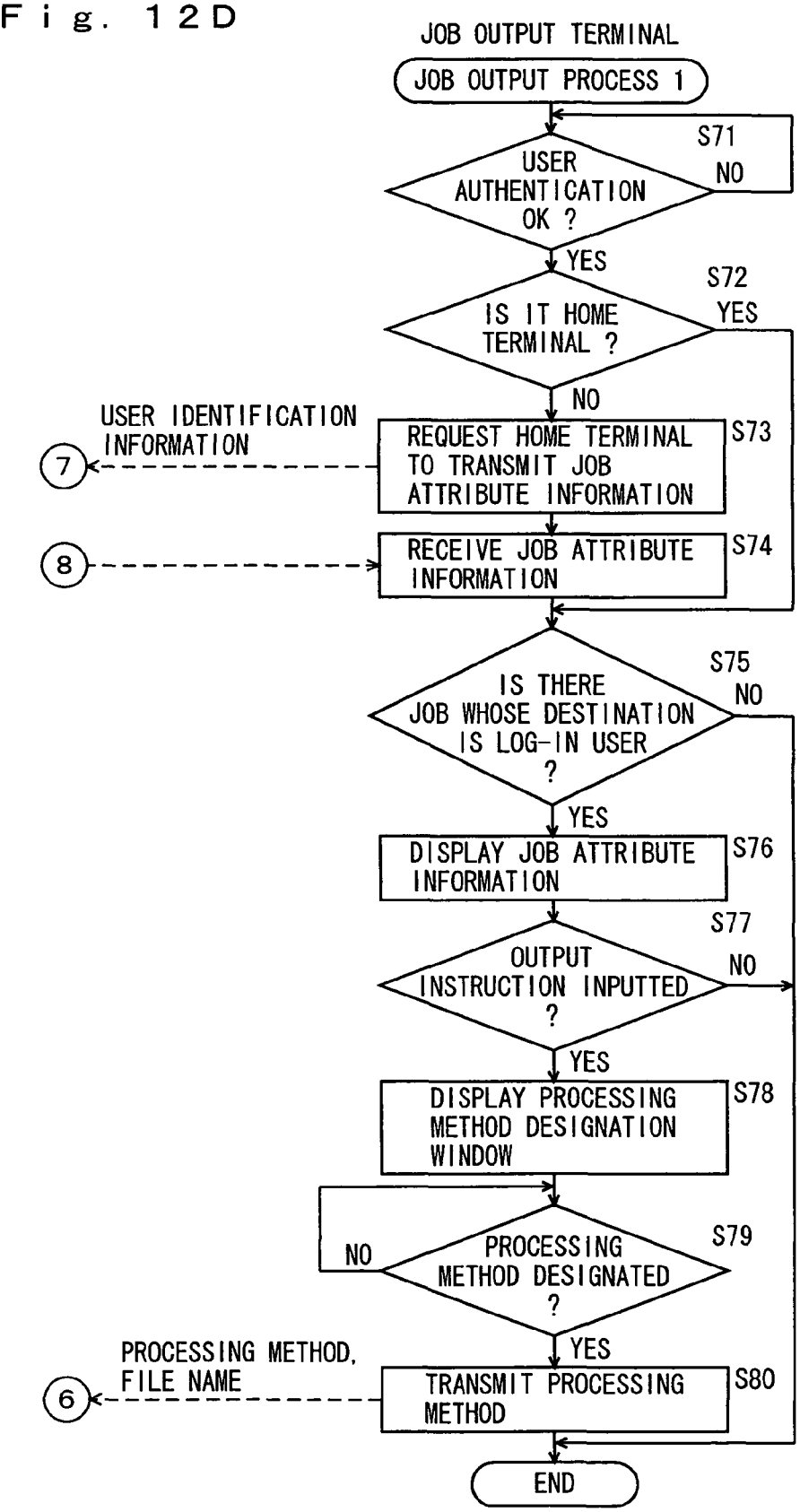

FIGS. 12A to 12D are flow charts showing a flow of a BOX transmission and reception process according to the modification of a job input process. FIG. 12A is a flow chart showing a flow of a job input process executed in a job input terminal. FIG. 12B is a flow chart showing a flow of a job management process executed in a job input terminal. FIG. 12C is a flow chart showing a flow of a job management process executed at a home terminal. FIG. 12D is a flow chart showing a flow of a job output process executed in a job output terminal. With reference to FIGS. 12A to 12D, FIGS. 12A to 12D differ from FIGS. 7A to 7D in that steps S31A and S32A are executed in place of steps S31 to S34. In step S31A, the process stands by until image data is received (NO in step S31A), and when the image data is received, the process proceeds to step S32A. In step S32A, it is determined whether the user to receive the received image data is designated or not. If the receiving user is designated, the process proceeds to step S34, but if not designated, the process is ended. The designation of the receiving user is determined by whether image data is stored in the area assigned to the user identification information "Julie" in HDD 107 or not.

In the next step, S35, the job attribute information shown in FIG. 8 is generated, but the job attribute information generated here only includes destination information and image data information and does not include information of transmission origin. This is because the information of transmission origin is not received. Moreover, in the case where the information of transmission origin is received along with the image data, the job attribute information may include the information of transmission origin.

In the modification of the job input process, it becomes possible for the user of the destination to designate the processing method upon obtaining image data even when the image data is inputted from outside the image processing system. Furthermore, when the processing method for the inputted image data is designated in advance, the designated process can be performed automatically according to the input of the image data.

[Modification of BOX Transmission and Reception]

In the above-described image processing system, image data to be transmitted is stored in a job input terminal, and job attribute information is stored in a home terminal of the user of the destination. On the other hand, in the image processing system according to the modification, the image data to be transmitted and the job attribute information are both stored in a home terminal of the user of the destination. Thus, a part of the job input process executed in the job input terminal in the above-described image processing system is executed at a home terminal of the user of the destination in the image processing system according to the modification.

Figure 13A:
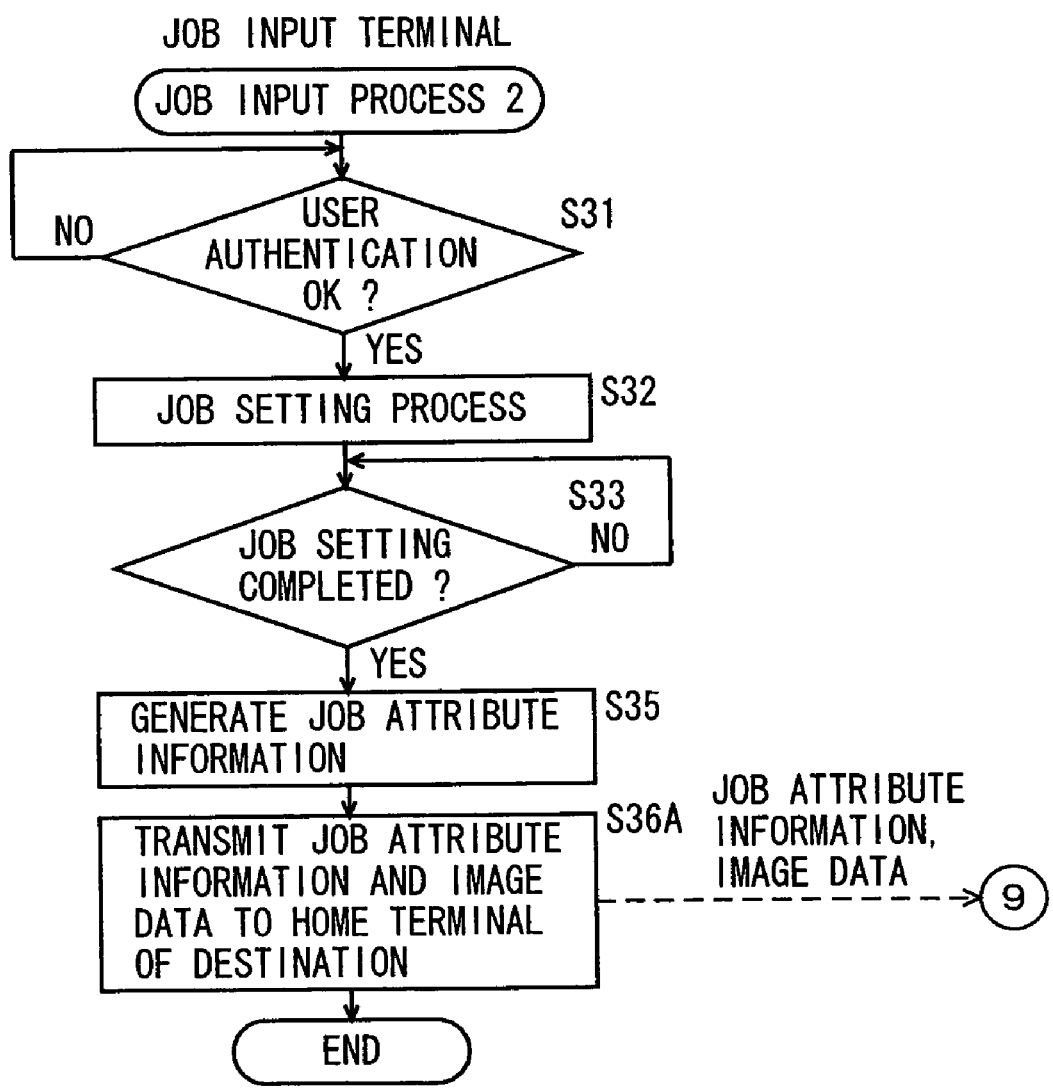
FIGS. 13A to 13C are flow charts showing a flow of a BOX transmission and reception process executed in an image processing system according to a modification.
Figure 13B:
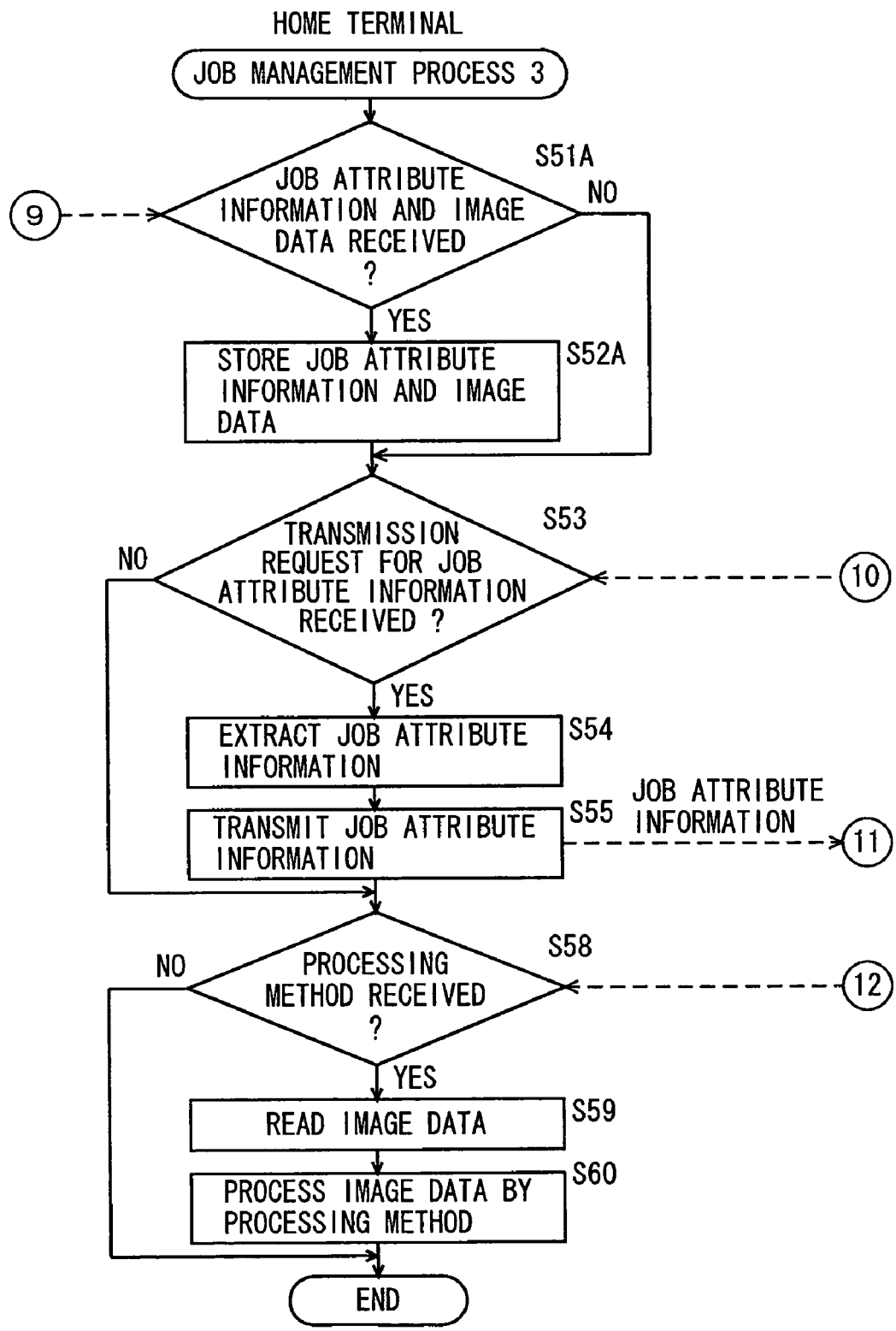
Figure 13C:
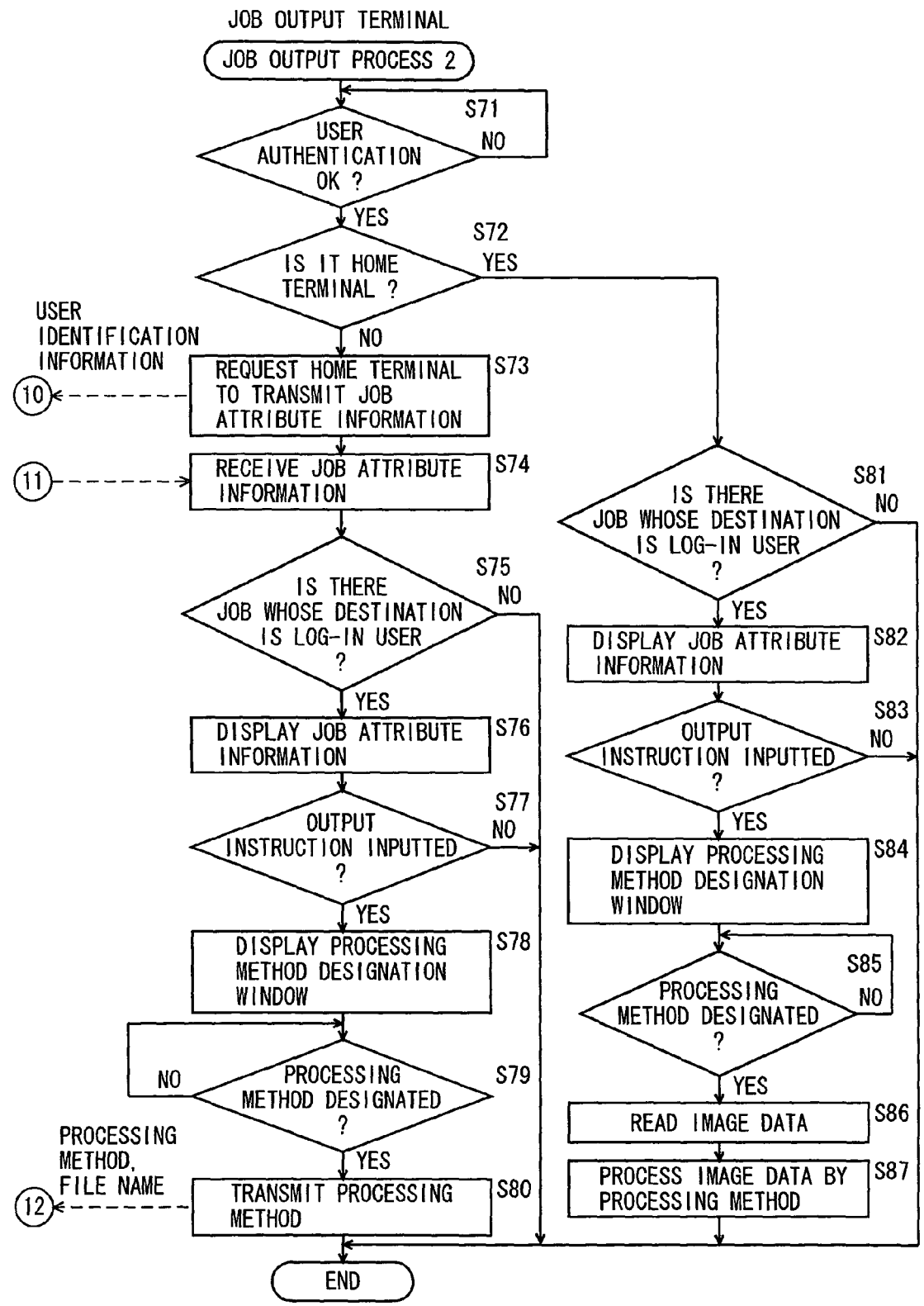

FIGS. 13A to 13C are flow charts showing a flow of a BOX transmission and reception process executed in the image processing system according to the modification. FIG. 13A is a flow chart showing a flow of a job input process according to the modification. FIG. 13B is a flow chart showing a flow of a job management process according to the modification. FIG. 13C is a flow chart showing a flow of a job output process according to the modification.

First, with reference to FIG. 13A, in MFP 100 which is a job input terminal according to the modification, steps S31 to S33 are executed in a similar manner to the job input terminal of the above-described image processing system. Thus, image data to be transmitted and a destination are decided.

Then, job attribute information is generated (step S35). Apparatus identification information of image data information in the job attribute information generated here is the apparatus identification information assigned to MFP 100A which is a home terminal. If the area to which the image data is to be stored in HDD 107 of MFP 100A is predetermined, a file name of the image data information is a file name including information that designates that area. Then, the generated job attribute information and the image data to be transmitted are transmitted to MFP 100A which is a home terminal of the user "Julie" of the destination (step S36A).

With reference to FIG. 13B, in MFP 100A which is a home terminal, it is determined whether the job attribute information and the image data are received or not (step S51A). If the job attribute information and the image data are received, the process proceeds to step S52A, and if they are not received, the process proceeds to step S53. In step S52A, the job attribute information and the image data received are stored in a prescribed area of HDD 107. In the job attribute information, the file name of the image data information is a direct path including information which specifies HDD 107 of MFP 100A (for instance, a device name or a drive name) so that, in the case where the job attribute information is to be stored in an area different from the area of HDD 107 specified by the file name of the image data information of that job attribute information, the job attribute information is stored with its file name changed.

At this stage, the image data to be transmitted and the job attribute information are stored in MFP 100A which is a home terminal of the user "Julie" of the destination. Moreover, a case where the job input terminal is used for both the job input terminal and a job output terminal is also possible. In such a case, while moving of data between apparatuses is not required, the expressions transmission of image data and/or reception of image data refer to exchanges of image data including an exchange of image data within the same terminal.

Next, the process of steps S53 to S55 is executed, and the job attribute information is transmitted to MFP 100B which is the job output terminal. Moreover, if job attribute information to be transmitted is not being stored, information which indicates that the job attribute information does not exist is transmitted to the job output terminal.

Then, the process of step S58 and beyond is executed. The process of steps S58 to S60 is the same as the process of steps S37 to S39 described in FIG. 7B. Thus, it is determined whether the processing method is received or not (step S58), and if the processing method is received, the process proceeds to step S59, and if it is not received, the process is ended. In step S59, image data specified by a file name received along with the received processing method is read. Then, the read image data is processed according to the processing method received (step S60).

Moreover, if a printout is designated as the processing method and if the apparatus designated by the processing method is a job output terminal, or here MFP 100B, without a home terminal MFP 100A giving a print instruction, image data can be transmitted from home terminal MFP 100A to job output terminal MFP 100B, and the image data can be printed at job output terminal MFP 100B according to the print process designated by the processing method.

Next, with reference to FIG. 13C, the process of steps S71 to S80 is the same as the job output process described in FIG. 7D. The process in the case where the job output terminal is a home terminal of the user of the user identification information "Julie" differs, however. This is because, if the job output terminal is a home terminal, the image data is being stored in HDD 107 of the job output terminal. Thus, in step S81, the job attribute information which includes the user identification information "Julie" who is the log-in user is extracted from the job attribute information stored in HDD 107. If such job attribute information is extracted, the process proceeds to step S82 as having a job, and if it is not extracted, the process is ended.

In step S82, the job attribute information including the user identification information "Julie" who is the log-in user is displayed on display portion 119B. Then, it is determined whether an output instruction is inputted or not (step S83), and if such an instruction is inputted, the process proceeds to step S84, and if not, the process is ended. When a plurality of job attribute information are displayed, the output instruction can be one to designate all of them, or it can be one to designate a part of them. In step S84, the processing method designation window shown in FIG. 9 is displayed. Then, in step S85, the process stands by until a processing method is designated according to the processing method designation window displayed in step S84 (NO in step S85), and when the processing method is designated, the process proceeds to step S86. In step S86, image data is read which is specified by a file name of image data information included in job attribute information for which an output instruction is given in step S83. Then, the read image data is processed according to the processing method designated in step S84 (step S87).

As described above, the image processing system according to the first embodiment is constructed by MFPs 100, 100A, 100B, and 100C each connected to a network. Each of MFPs 100, 100A, 100B, and 100C stores in HDD 107 registered user information that at least includes user identification information for identifying a user. In each of MFPs 100, 100A, 100B, and 100C, a data processing program is executed by CPU 101.

For example, MFP 100 requests at least one of other MFPs 100A, 100B, and 100C, for instance, MFPs 100A, 100B, and 100C, to transmit registered user information stored in HDD 107 provided in MFP 100A, receives the registered user information transmitted by MFPs 100A, 100B, and 100C according to the request, and stores in HDD 107 user data that at least includes the received registered user information. User data is the data which associates user identification information with apparatus identification information for identifying each of MFPs 100, 100A, 100B, and 100C. Thus, if the registered user information including the user identification information is stored in any one of MFPs 100, 100A, 100B, and 100C connected to a network, for instance, in MFP 100, that registered user information can be referred to in MFPs 100A, 100B, and 100C which do not store that registered user information.

In addition, each of MFPs 100, 100A, 100B, and 100C further stores user data that at least includes the registered user information stored in its own HDD 107 in addition to the received registered user information.

Moreover, the user data is the data which associates registered user information with apparatus identification information for identifying each of MFPs 100, 100A, 100B, and 100C in which the registered user information was stored so that it can be determined from the user data which of the apparatuses it was that the registered user information was stored in.

Further, each of MFPs 100, 100A, 100B, and 100C displays the user identification information included in the user data stored in HDD 107 (S25), and accepts designation of the displayed user identification information (step S26). Thus, the user identification information of a desired user can be designated from among the user identification information stored in any of MFPs 100, 100A, 100B, and 100C.

Furthermore, the user data includes user identification information and apparatus identification information of a home terminal as information of transmission destination of data, and when data is input (S32), each of MFPs 100, 100A, 100B, and 100C transmits the inputted data according to the information of transmission destination specified by the designated user identification information (S34 to S39). Thus, the inputted data can be transmitted to any of the users specified by the user identification information stored in any of MFPs 100, 100A, 100B, and 100C.

Upon inputting image data, when the image data is inputted into scanner 113, FAX 117, or communication I/F 111 at a job input terminal, for instance, at MFP 100, CPU 101 stores the image data in HDD 107 of job input terminal MFP 100 and generates job attribute information which associates location information of the image data on a network with user identification information. Then, CPU 101 transmits the generated job attribute information to a home terminal, for instance, to MFP 100A, to be stored therein. The location information of the image data on the network includes a file name and an IP address assigned to MFP 100 in which the image data is stored.

Furthermore, according to the modification, in a job input terminal MFP 100, when image data is inputted, CPU 101 causes the image data to be stored in HDD 107 of a home terminal MFP 100A, and generates job attribute information which associates location information of the image data on the network with user identification information. Then, CPU 101 transmits the generated job attribute information to home terminal MFP 100A to be stored therein. The location information of the image data on the network includes a file name and an IP address assigned to MFP 100A in which the image data is stored.

Since any of MFPs 100, 100A, 100B, and 100C in which the job attribute information is to be stored is defined by user data, MFPs 100, 100A, 100B, and 100C which store the job attribute information related to the user can be specified from the user identification information. In addition, the user identification information and the location information of the image data on the network are associated by the job attribute information so that the location on network 2 where the image data is stored can be determined from the job attribute information. Thus, the image data can be stored in any apparatus of MFPs 100, 100A, 100B, and 100C.

On the other hand, in a home terminal of the user, here, in MFP 100A, its CPU 101 receives job attribute information generated by a job input terminal, here, by MFP 100, and stores the job attribute information that includes apparatus identification information of MFP 100A. Thus, there is no need to search for MFPs 100, 100A, 100B, and 100C that store the job attribute information in order to obtain the job attribute information, and the communication traffic can be reduced so as to allow the effective use of network 2.

Moreover, upon outputting image data, in a job output terminal, for instance, in MFP 100B, when user identification information is inputted, job attribute information including that user identification information is obtained from HDD 107 of a home terminal of the user, or here MFP 100A, and obtains the image data associated by the obtained job attribute information. The job attribute information includes the user identification information so that, by obtaining the job attribute information which includes certain user identification information, all the image data associated with that user identification information can be obtained. In other words, the image data related to a certain user can be obtained at any apparatus of a plurality of MFPs 100, 100A, 100B, and 100C. Thus, image data inputted at any apparatus of MFPs 100, 100A, 100B, and 100C can be obtained at any one apparatus of MFPs 100, 100A, 100B, and 100C.

Moreover, when user identification information is inputted due to an inquiry from a job output terminal, or here, from MFP 100B, if job attribute information which includes that user identification information is stored in HDD 107, a home terminal of the user, or here MFP 100A, reads and transmits that job attribute information to MFP 100B that made the inquiry. As a result, the job attribute information is obtained at MFP 100B that has made the inquiry. Thus, regardless of which of MFPs 100, 100A, 100B, and 100C it is that the user identification information is inputted, the job attribute information including that user identification information can be obtained from any of MFPs 100, 100A, 100B, and 100C.

Furthermore, in the image processing system according to the modification, image data is stored in a home terminal. A user uses the home terminal most frequently so that, by storing the image data in the home terminal in advance, the throughput time for obtaining the image data can be shortened.

Furthermore, in a job output terminal, or here in MFP 100B, when a job whose destination is the log-in user exists (step S75), a processing method for processing image data is designated (step S84), and causes the terminal that stores the image data to process the image data by the designated processing method (steps S80 and S39, S80 and S60, or step S87).

Moreover, in this embodiment, a processing method is transmitted from a job output terminal to a job input terminal or a home terminal that stores image data to cause the job input terminal or the home terminal to process the image data; however, instead of transmitting the processing method to the job input terminal or the home terminal from the job output terminal, the image data can be transmitted to the job output terminal from the job input terminal or the home terminal that stores the image data so as to allow the image data to be processed at the job output terminal.

Second Embodiment

An overall arrangement of an image processing system according to a second embodiment is similar to the image processing system according to the first embodiment shown in FIG. 1. Moreover, the hardware arrangement of MFPs 100, 100A, 100B, and 100C forming an image processing system according to the second embodiment is the same as that of MFP 100 shown in FIG. 2. Thus, the description thereof will not be repeated here. In the image processing system according to the first embodiment, first or second user data is stored in MFPs 100, 100A, 100B, and 100C. In the image processing system according to the second embodiment, however, the first or second user data is not stored in MFPs 100, 100A, 100B, and 100C. Thus, the initial setting process and the connection process shown in FIGS. 3A and 3B are not executed. When MFP 100 is connected anew to a network 2, the process required for establishing connection to network 2 (for instance, setting of an IP address) is performed and registered user information is stored.

In MFPs 100, 100A, 100B, and 100C according to the second embodiment, a detection process is executed in order to detect a home terminal of a user of a destination. FIGS. 14A and 14B are flow charts showing a flow of a home terminal detection process. FIG. 14A shows a flow of a detection process A executed at a terminal that attempts to detect a home terminal, and FIG. 14B shows a flow of a detection process B executed at a terminal other than the terminal executing detection process A. Detection process A and detection process B are implemented by loading a detection process A program and a detection process B program stored in flash ROM 108 into RAM 105 of MFPs 100, 100A, 100B, and 100C and executing the detection process A program and the detection process B program by CPU 101. The detection process A program and the detection process B program are a part of a data processing program. Here, for ease of description, a terminal that attempts to detect a home terminal is referred to as a detecting terminal, and a terminal other than the terminal executing detection process A is referred to as a detected terminal.

With reference to FIGS. 14A and 14B, in a detecting terminal, a detection request for detecting a home terminal is transmitted by broadcast. The detection request includes user identification information of a user of a destination. In a detected terminal, the process stands by until the detection request is received (NO in step S95), and the process proceeds to step S96 when the detection request is received. In step S96, it is detected whether registered user information including user identification information included in the detection request received in step S95 is stored in HDD 107 or not. If such registered user information is stored, the process proceeds to step S97, and if not, step S97 is skipped and the process is ended. When the registered user information including the user identification information included in the detection request is stored in HDD 107, the detected terminal is a home terminal of the user of that user identification information. Thus, in step S97, in order to notify the detecting terminal that it is itself a home terminal, the detected terminal transmits apparatus identification information for identifying the detected terminal to the detecting terminal.

On the other hand, in the detecting terminal, it is determined whether the apparatus identification information is received according to the transmission of the detection request (step S91) or not (step S92). If it is received, the process proceeds to step S93, but if it is not received, the process proceeds to step S94. In step S93, the terminal identified by the received apparatus identification information is set as a home terminal of the user specified by the user identification information. In step S94, it is set as a home terminal of the user specified by the user identification information being nonexistent. In this case, error handling can also be performed.

Moreover, although the detection request is transmitted by broadcast in step S91, other MFPs 100A, 100B, and 100C connected to network 2 can be detected and the detection request can be transmitted to other MFPs 100A, 100B, and 100C one by one. In this case, by ending the process at the point when a home terminal is detected, the processing time can be efficiently shortened.

When the process shown in FIGS. 7A to 7D, FIGS. 12A to 12D, or FIGS. 13A to 13C is executed at each of MFPs 100, 100A, 100B, and 100C of the image processing system according to the second embodiment, the above-described detection process is executed prior to the process of transmitting data to a home terminal. More specifically, detection process A is executed immediately before step S36 in FIGS. 7A and 12A, immediately before step S73 in FIGS. 7D and 12D, immediately before step S36A in FIG. 13A, and immediately before step S73 in FIG. 13C.

As described above, in the image processing system according to the second embodiment, a detection process is executed in order to detect a home terminal of the user of the destination. Thus, a similar effect to that achieved by the image processing system according to the first embodiment can be achieved without storing the first or second user data in MFPs 100, 100A, 100B, and 100C.

Third Embodiment

Next, an image processing system according to a third embodiment will be described. An overall arrangement of the image processing system according to the third embodiment is similar to the image processing system according to the first embodiment shown in FIG. 1. Moreover, the hardware arrangement of MFPs 100, 100A, 100B, and 100C forming an image processing system according to the third embodiment is the same as that of MFP 100 shown in FIG. 2. Thus, the description thereof will not be repeated here.

In the image processing system according to the first embodiment, when MFP 100 is to be connected anew to network 2 where MFPs 100A, 100B, and 100C are already connected thereto, the initial setting process shown in FIG. 3A is executed in MFP 100, and the connection process shown in FIG. 3B is executed in other MFPs 100A, 100B, and 100C. Each of these processes is executed in the image processing system according to the third embodiment in a similar manner, and first or second user data is generated in MFPs 100, 100A, 100B, and 100C. The first or second user data generated in the image processing system according to the third embodiment, however, does not require apparatus identification information for identifying a home terminal.

Figure 15A:
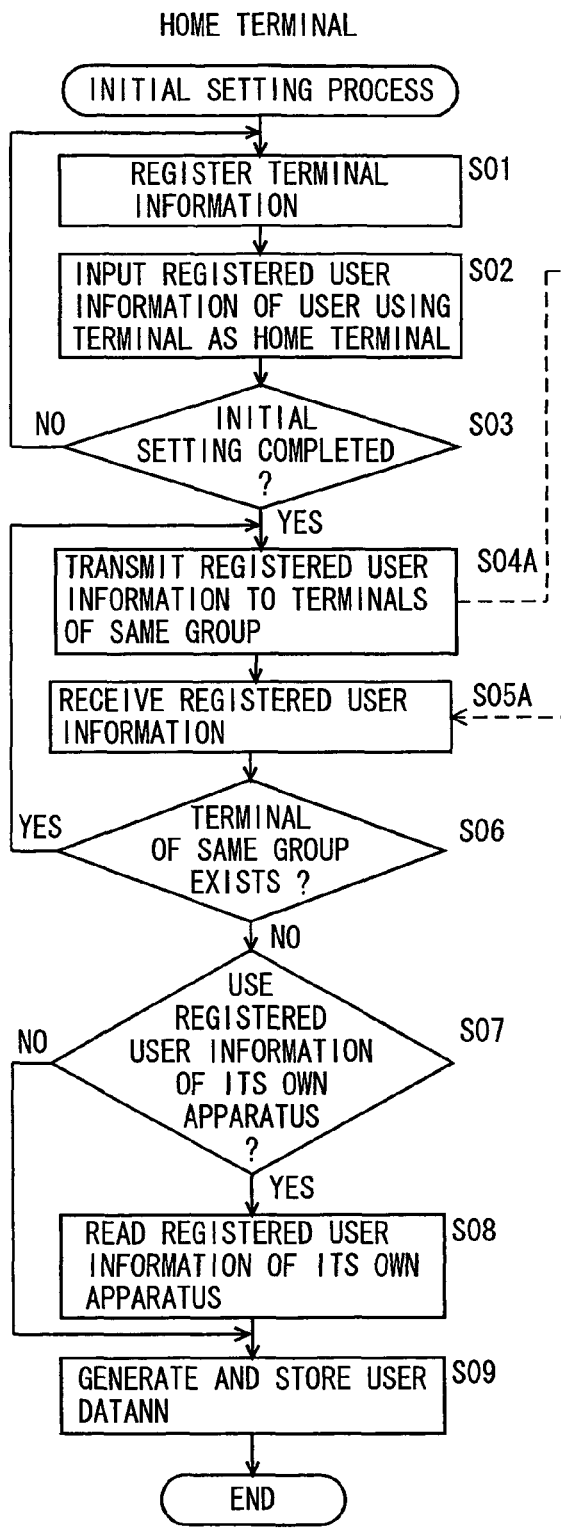
FIGS. 15A and 15B are other flow charts showing a flow of a process executed when an MFP is newly connected to a network.
Figure 15B:
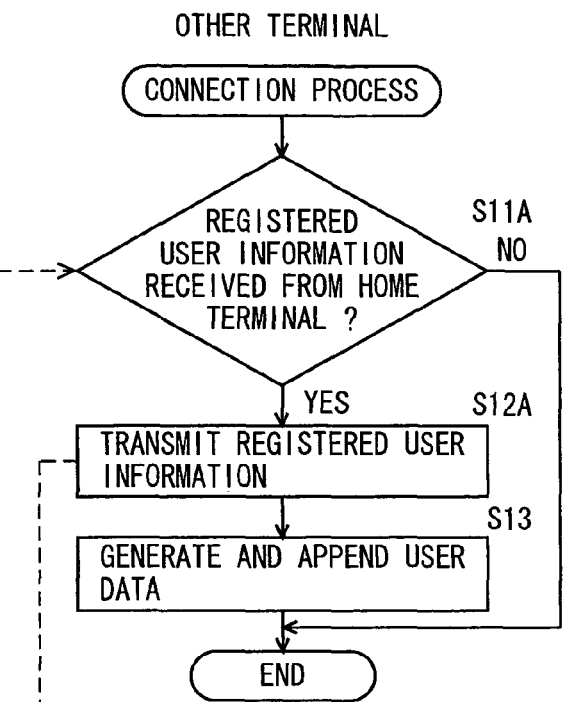

FIGS. 15A and 15B are other flow charts showing a flow of a process executed when MFP 100 is newly connected to a network. FIG. 15A shows another flow of an initial setting process executed by MFP 100, and FIG. 15B shows another flow of a connection process executed in each of MFPs 100A, 100B, and 100C when the initial setting process is executed in MFP 100. The initial setting process and the connection process are implemented by respectively loading an initial setting program and a connection program stored in flash ROM 108 into RAM 105 and executing them by CPU 101. The initial setting program and the connection program are a part of a data processing program.

With reference to FIG. 15A, the initial setting process here differs from the initial setting process shown in FIG. 3A in that, while terminal information and registered user information are transmitted in step S04, registered user information is transmitted while the terminal information is not transmitted in step S04A, and in that, while the terminal information and the registered user information are received in step S05, the registered user information is received while the terminal information is not received in step S05A. Moreover, with reference to FIG. 15B, the initial setting process here differs from the initial setting process shown in FIG. 3B in that, while terminal information and registered user information are received in step S11, the registered user information is received while the terminal information is not received in step S11A, and in that, while terminal information and registered user information are transmitted in step S12, the registered user information is transmitted while the terminal information is not transmitted in step S12A.

Thus, in MFP 100, user data is generated from registered user information in step S09. This user data includes the registered user information. As for the generated user data, if it is determined in step S07 that the registered user information of MFP 100 itself is to be used, all of the registered user information stored in MFPs 100, 100A, 100B, and 100C put together becomes the user data (first user data), and if it is determined in step S07 that the registered user information of MFP 100 itself is not to be used, all of the registered user information stored in MFPs 100A, 100B, and 100C but not of MFP 100 put together becomes the user data (second user data).

In addition, in each of MFPs 100A, 100B, and 100C, user data is generated from the registered user information of MFP 100 received in step S11A, and the generated user data is appended to the user data already stored in HDD 107 (step S13).

FIGS. 16A and 16B are diagrams for describing the first and second user data according to the third embodiment. FIGS. 16A and 16B show user data generated in the case where the registered user information shown in FIGS. 4A to 4D are stored in each of MFPs 100, 100A, 100B, and 100C. FIG. 16A is another diagram showing an example of the first user data, and FIG. 16B is another diagram showing an example of the second user data. With reference to FIGS. 16A and 16B, the first and second user data differ from the first and second user data shown in FIGS. 4E and 4F in that they include registered user information but not information related to a home terminal.

[BOX Transmission and Reception]

Here, to simplify the description, the example will be described in which the user of user identification information "David" inputs at MFP 100 a job of transmitting image data to the destination of user identification information "Julie." In this case, a job input process is executed in MFP 100. In the job input process, user authentication is performed in response to a log-in request by the user "David," and thereafter, a job setting process is executed. Moreover, although the example of executing the job input process at a home terminal is described here, the job input process can also be executed at a terminal other than the home terminal.

Figure 17A:
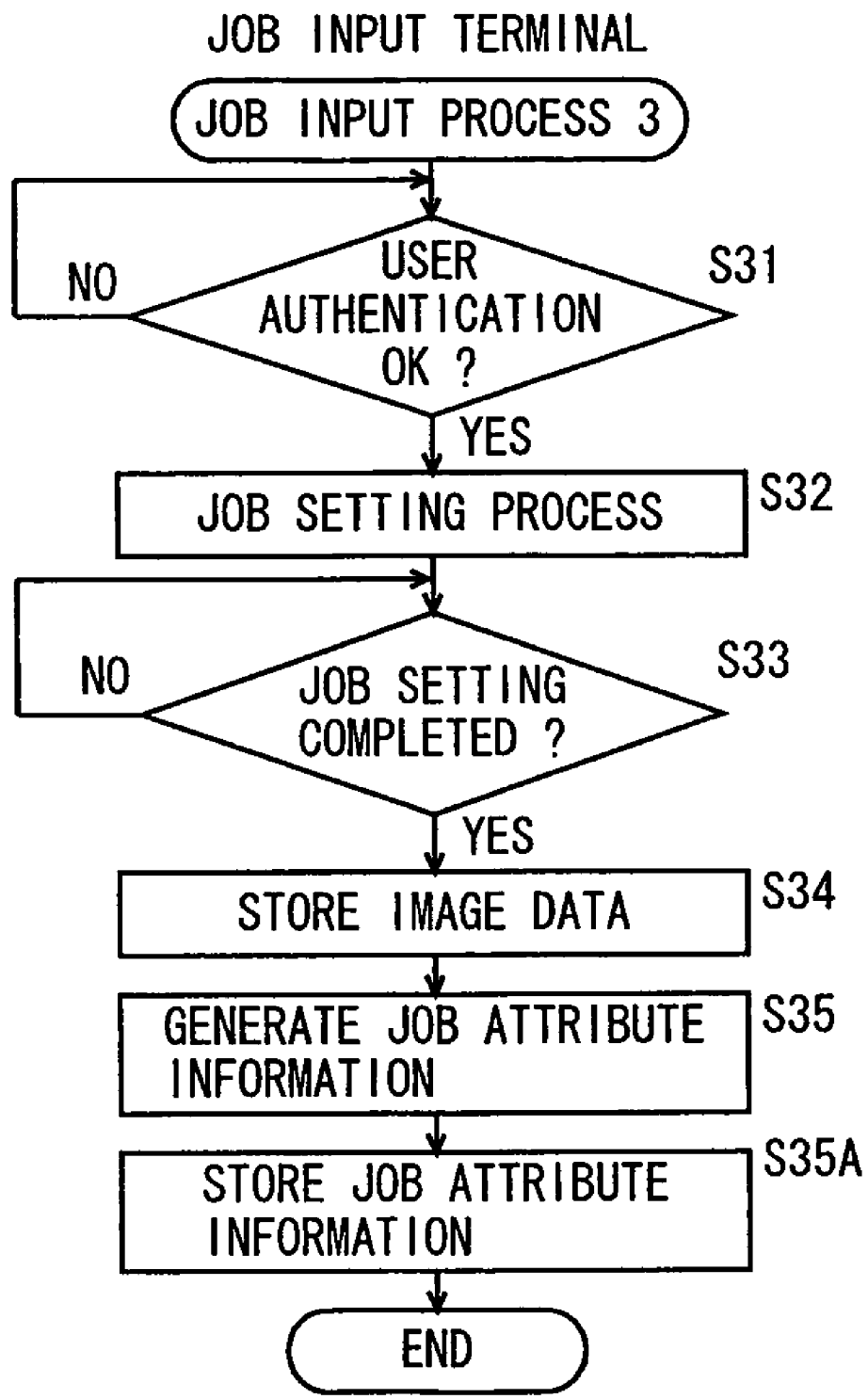
FIGS. 17A to 17C are flow charts showing a flow of a BOX transmission and reception process executed in an image processing system according to the third embodiment.
Figure 17B:
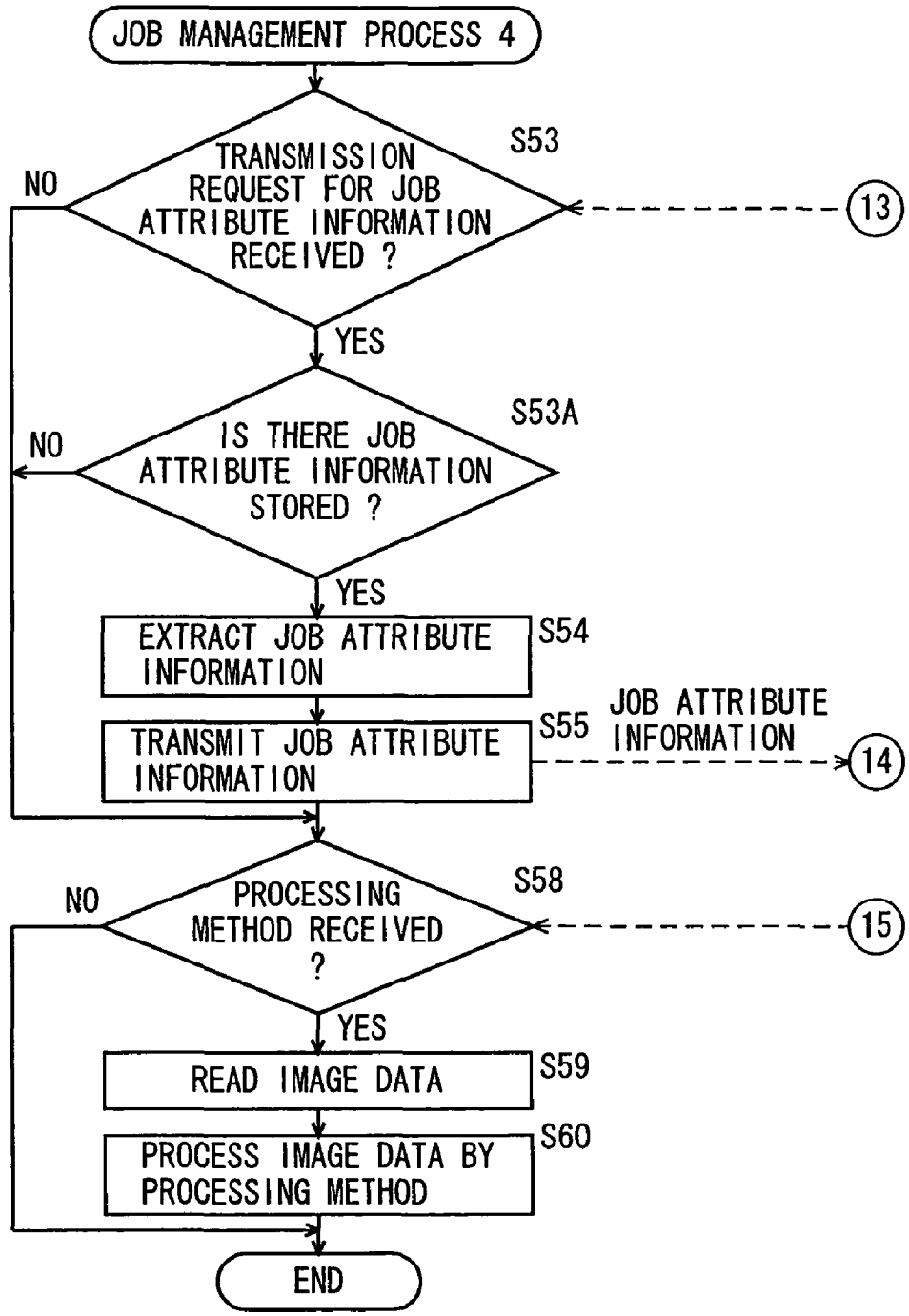
Figure 17C:
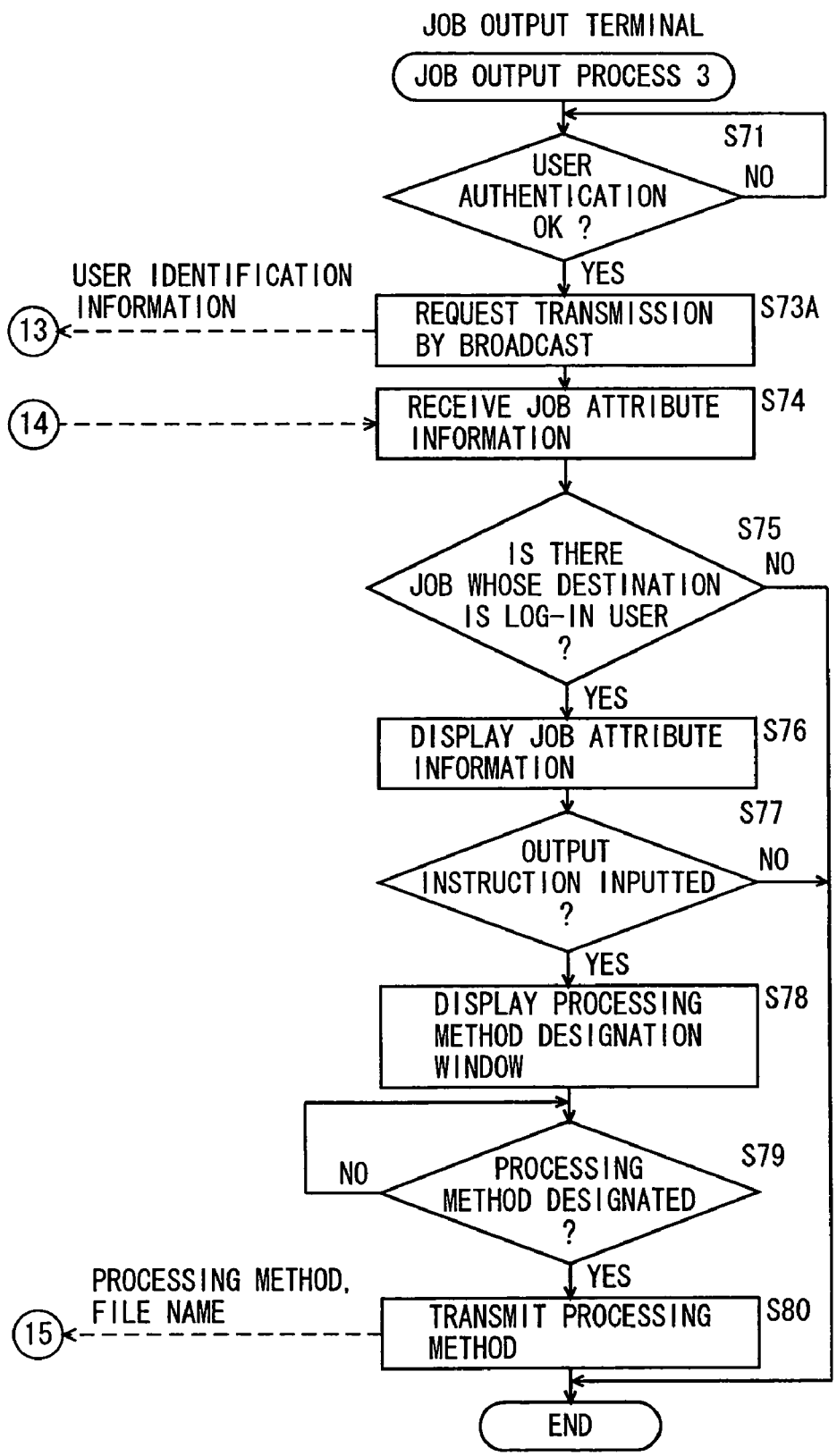

FIGS. 17A to 17C are flow charts showing a flow of the BOX transmission and reception process executed in the image processing system according to the third embodiment. FIG. 17A is another flow chart showing a flow of a job input process executed at a job input terminal. FIG. 17B is another flow chart showing a flow of a job management process executed at a terminal other than an output terminal. FIG. 17C is another flow chart showing a flow of a job output process executed at a job output terminal.

With reference to FIG. 17A, the process of steps S31 to S34 is the same as the job input process according to the first embodiment. In step S35, job attribute information is generated, but the job attribute information generated here does not include apparatus identification information of a home terminal. Then, the job attribute information generated in step S35 and image data decided in step S33 to be transmitted are stored in a prescribed area of HDD 107 of MFP 100 which is the job input terminal (step S35A).

FIG. 18 is a diagram showing an example of a format of job attribute information according to the third embodiment. With reference to FIG. 18, the job attribute information includes information of transmission origin, destination information, and image data information. The information of transmission origin is user identification information of the user who instructed the execution of a job input process, who is, here, "David." The destination information includes user identification information of the user of the destination. Here, the user identification information of the destination information is "Julie." The image data information includes apparatus identification information of a terminal in which the image data information is stored and a file name stored in that terminal. Here, the image data is stored in HDD 107 of MFP 100 which is the job input terminal so that the apparatus identification information of the image data information is an IP address of MFP 100, and the file name is designated by a direct path including information which specifies HDD 107 (for instance, a device name or a drive name). Thus, the image data information is location information on network 2 where the image data is stored. The image data information can be an URL (Uniform Resource Locator).

Moreover, although the image data to be transmitted is here stored in MFP 100 which is the job input terminal, it can be stored in other MFPs 100A, 100B, and 100C. The job attribute information is not required to include the information of transmission origin, and it needs only to include at least the user identification information of the user of the destination and the location information on network 2 of the image data to be transmitted.

Next, output of the image data will be described. Here, an example will be described in which the user of user identification information "Julie" logs into MFP 100B. In this case, MFP 100B corresponds to the job output terminal.

With reference to FIG. 17C, in MFP 100B which is the job output terminal, user authentication of the user of the user identification information "Julie" is performed (step S71). As a result of the user authentication, if the user is authenticated, log-in is permitted and the process proceeds to step S73A, but if not authenticated, log-in is not permitted and the process stands by. In other words, a job output process is a process which is executed on the condition that at least user identification information is inputted at the job output terminal.

In step S73A, a signal requesting transmission of job attribute information which includes the user identification information "Julie" is transmitted by broadcast. This signal that requests the transmission of the job attribute information includes the user identification information "Julie."

With reference to FIG. 17B, in step S53, it is determined whether the request for transmission of the job attribute information is received from the job output terminal or not. If it is received, the process proceeds to step S53A, and if it is not received, the process proceeds to step S58. In step S53A, it is determined whether the job attribute information including the user identification information included in the transmission request is stored in HDD 107 or not. When such job attribute information is stored, the process proceeds to step S54, and if it is not stored, the process proceeds to step S58. In step S54, using the user identification information included in the transmission request, the job attribute information including that user identification information is extracted from the job attribute information stored in HDD 107. In the case where a plurality of corresponding job attribute information exist in HDD 107, all of the corresponding job attribute information is extracted. Then, the extracted job attribute information is transmitted to the job output terminal that transmitted the transmission request (step S55). Moreover, the process of the following steps S58 to S60 is the same as the process of steps S37 to S39 shown in FIG. 7B so that the description will not be repeated here.

Once again with reference to FIG. 17C, at the job output terminal, the job attribute information is received according to the transmission request transmitted in step S73A (step S74). The process of steps S75 to S80 executed at the job output terminal after the job attribute information is received is the same as the process shown in FIG. 7D so that the description will not be repeated here.

Moreover, although the initial setting process shown in FIG. 15A and the connection process shown in FIG. 15B are executed for MFPs 100, 100A, 100B, and 100C in the third embodiment, these processes are not always required to be executed. In other words, in the image processing system according to the third embodiment, the process shown in FIGS. 17A to 17C can be executed even when each of MFPs 100, 100A, 100B, and 100C does not store the first or second user data. In this case, in step S32 of FIG. 17A, designation of image data to be transmitted and designation of user identification information for specifying the user of the destination of transmission are performed. As to the user identification information, registered user information is not required to be stored in a job input terminal, for instance, in MFP 100, that executes the process of step S32, and the registered user information needs only to be stored in any of MFPs 100, 100A, 100B, and 100C.

As described above, in the image processing system according to the third embodiment, each of MFPs 100, 100A, 100B, and 100C stores in HDD 107 user data which at least includes user identification information for identifying each of a plurality of users. In each of MFPs 100, 100A, 100B, and 100C, a data processing program is executed in CPU 101.

Upon inputting image data; when the image data is inputted into scanner 113, FAX 117, or communication I/F 111 at a job input terminal, for instance, at MFP 100, CPU 101 stores the image data in HDD 107 of job input terminal MFP 100, generates job attribute information which associates location information of the image data on a network with user identification information, and stores the generated job attribute information in HDD 107 of MFP 100. Since the user identification information and the location information of the image data on network 2 are associated by the job attribute information, the image data can be stored in any apparatus of MFPs 100, 100A, 100B, and 100C. The location information of the image data on network 2 includes a file name and an IP address assigned to MFP 100 in which the image data is stored.

Moreover, upon outputting image data, when user identification information is inputted, in order to obtain job attribute information including that user identification information, CPU 101 of a job output terminal, for instance, MFP 100B, requests transmission of the job attribute information by broadcast, or requests other MFPs 100, 100A, and 100C, one by one, to transmit of the job attribute information.

On the other hand, when user identification information is inputted due to an inquiry from MFP 100B which is the job output terminal, if job attribute information including that user identification information is stored in HDD 107, MFP 100 which is the job input terminal reads and transmits that job attribute information to MFP 100B which is the job output terminal that made the inquiry. Thus, the job attribute information is obtained at MFP 100B which is the job output terminal that made the inquiry. As a result, regardless of which of MFPs 100, 100A, 100B, and 100C it is that the user identification information is inputted, the job attribute information including that user identification information can be obtained from any of MFPs 100, 100A, 100B, and 100C.

Furthermore, in response to a transmission request for job attribute information, CPU 101 of job output terminal MFP 100B receives the job attribute information from a job input terminal which stores the job attribute information including user identification information, or here, from MFP 100, and obtains image data associated by the obtained job attribute information. The job attribute information includes the user identification information so that, by obtaining the job attribute information including certain user identification information, all the image data associated with that user identification information can be obtained. In other words, the image data related to a certain user can be obtained at any apparatus of a plurality of MFPs 100, 100A, 100B, and 100C. Thus, image data inputted at any apparatus of MFPs 100, 100A, 100B, and 100C can be obtained at any apparatus of MFPs 100, 100A, 100B, and 100C.

Moreover, when user identification information is inputted due to an inquiry from job output terminal MFP 100B, if job attribute information including that user identification information is stored in HDD 107, job input terminal MFP 100 reads and transmits that job attribute information to MFP 100B that made the inquiry. As a result, the job attribute information is obtained at MFP 100B that made the inquiry. Thus, regardless of which of MFPs 100, 100A, 100B, and 100C it is that the user identification information is inputted, the job attribute information including that user identification information can be obtained from any of MFPs 100, 100A, 100B, and 100C.

Moreover, in the third embodiment, a processing method is transmitted from a job output terminal to a job input terminal that stores image data to cause the job input terminal to process the image data; however, instead of transmitting the processing method to the job input terminal from the job output terminal, the image data can be transmitted to the job output terminal from the job input terminal that stores the image data so as to allow the image data to be processed at the job output terminal.

Furthermore, in the above-described example, the image processing system is constructed by MFPs 100, 100A, 100B, and 100C; however, a personal computer can be connected to network 2 and made to execute the same process executed by MFPs 100, 100A, 100B, and 100C. In such a case, it is also possible to construct the image processing system by providing in the personal computer a destination designation portion to display the user who is to be the destination in a manner that allows the designation of the user as the destination and a data designation portion to designate data to be delivered to the designated destination. In this example, also, it is possible to use MFPs 100, 100A, 100B, and 100C as job output terminals and to acquire data, and needless to say, a data transmission portion is provided in the personal computer.

Moreover, a server can be connected to network 2 and user data may be stored only in the server. In this case, MFPs 100, 100A, 100B, and 100C need only to download the user data from the server or to refer to the user data stored in the server every time the user data is required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing system, comprising a plurality of image processing apparatuses each connected to a network wherein said plurality of image processing apparatuses each includes a user data storage portion to store user data including user identification information for identifying each user;
   an input apparatus among said plurality of image processing apparatuses, wherein a job is inputted, includes
      a destination designation portion to display a user identified by the user identification information stored in the user data storage portion so as to designate the user as a destination,
      a data designation portion to designate image data for the destination designated in the destination designation portion,
      a relation data generating portion to generate relation data associating location information of said designated data in said network with the user identification information of said designated user as the destination,
      a storing portion to store said relation data, and
      a controlling portion to cause another image processing apparatus, which is identified as a home terminal of the user designated as the destination, among said plurality of image processing apparatuses to store said relation data if the input apparatus is not identified as a home terminal of the user designated as the destination, and cause said storing portion to store said relation data if the input apparatus is the home terminal of the user designated as the destination; and
   an output apparatus among said plurality of image processing apparatuses, to output the job, includes
      a data processing method designation portion to designate a data processing method for the image data, wherein the data processing method is designated by the user designated as the destination,
      a user identification information input portion to accept an input of user identification information,
      a determination portion to determine whether or not the output apparatus is identified as a home terminal of the user corresponding to the accepted user identification information,
      an acquiring portion to acquire said relation data from a terminal identified as a home terminal of the user corresponding to the accepted user identification information when said determination portion determines that the output apparatus is not the home terminal of the user corresponding to the accepted user identification information,
      a data extracting portion to extract image data based on said relation data acquired from said home terminal of the user corresponding to the accepted user identification information, and
      a data processing portion to process the image data extracted by the data extracting portion based on the data processing method designated in the data processing method designation portion.

2. The image data processing system according to claim 1, further comprising: a data transmission portion to transmit the image data designated in the data designation portion to the destination designated in the destination designation portion.

3. The image data processing system according to claim 1, wherein the destination designation portion displays a user identified by the user identification information stored in another image processing apparatus so as to designate the user as a destination.

4. The image data processing system according to claim 3, said input apparatus is a computer.

5. The image data processing system according to claim 1, wherein said destination designation portion includes a recommended processing method designation portion to designate a recommended data processing method for the image data, wherein
said relation data generating portion generates relation data further associating with said recommended data processing method, and
said data processing method designation portion allows to designate the recommended data processing method associated with said data.

6. The image data processing system according to claim 1, wherein
said data processing portion, in a case where data specified by said acquired relation data is stored in its apparatus, processes said extracted data by a processing method designated by said data processing method designation portion; and
said data processing portion, in a case where data specified by said acquired relation data is not stored in its apparatus,
transmits the data processing method for the image data designated in the data processing method designation portion.

7. The image data processing system according to claim 1, further comprising: a data obtaining portion to obtain the image data designated in the data designation portion.

8. The image data processing system according to claim 1, wherein the data processing method for the image data designated in the data processing method designation portion is stored in association with the user identification information corresponding to the user.

9. The image data processing system according to claim 8, wherein the data processing portion automatically processes the image data based on the data processing method, stored in association with the user identification information, in response to designation of the image data.

10. The image data processing system according to claim 1, wherein the data processing method designation portion designates a protocol of a data transmission for the image data.

11. The image data processing system according to claim 1, wherein the data processing method designation portion designates an image processing for the image data and/or a post-processing for an image forming process.

12. An image data processing system comprising a plurality of image processing apparatuses connected to a network, and a computer connected to the network, wherein:
said computer includes a user data storage portion to store user data associating user identification information for identifying each user with apparatus identification information for identifying each apparatus;
an input apparatus among said plurality of image processing apparatuses, wherein a job is inputted, includes
a destination designation portion to display a user identified by the user identification information stored in the user data storage portion of said computer so as to designate the user as a destination,
a data designation portion to designate image data for the destination designated in the destination designation portion,
a relation data generating portion to generate relation data associating location information of said designated data in said network with the user identification information of said designated user as the destination,
a storing portion to store said relation data, and
a controlling portion to cause another image processing apparatus among said plurality of image processing apparatuses, which is identified as a home terminal of the user designated as the destination, to store said relation data if the input apparatus is not identified as a home terminal of the user designated as the destination, and cause said storing portion to store said relation data if the input apparatus is the home terminal of the user designated as the destination; and
an output apparatus among said plurality of image processing apparatuses, to output the job, includes,
a data processing method designation portion to designate a data processing method for the image data, wherein the data processing method is designated by the user designated as the destination;
a user identification information input portion to accept an input of user identification information,
a determination portion to determine whether or not the output apparatus is identified as a home terminal of the user corresponding to the accepted user identification information,
an acquiring portion to acquire said relation data from a terminal identified as a home terminal of the user corresponding to the accepted user identification information when said determination portion determines that the output apparatus is not the home terminal of the user corresponding to the accepted user identification information,
a data extracting portion to extract image data based on said relation data acquired from said home terminal of the user corresponding to the accepted user identification information, and
a data processing portion to process the image data extracted by the data extracting portion based on the data processing method designated in the data processing method designation portion.

13. An image data processing system including a plurality of image processing apparatuses each connected to a network, wherein:
said plurality of image processing apparatuses each includes a user data storage portion to store user data including user identification information for identifying each user;
an input apparatus among said plurality of image processing apparatuses, wherein a job is inputted, includes
a data input portion into which image data is inputted,
a relation portion to associate the image data with the user identification information stored in the user data storage portion,
a destination designation portion to designate a user identified by the user identification information associated by said relation portion as a destination,
a relation data generating portion to generate relation data associating location information of said inputted data in said network with the user identification information of said designated user as the destination,
a storing portion to store said relation data, and
a controlling portion to cause another image processing apparatus, which is identified as a home terminal of the user designated as the destination, among said plurality of image processing apparatuses to store said relation data if the input apparatus is not identified as a home terminal of the user designated as the destination, and cause said storing portion to store said relation data if the input apparatus is the home terminal of the user designated as the destination; and
an output apparatus among said plurality of image processing apparatuses, to output the job, includes,
a data processing method designation portion to designate a data processing method for the image data, wherein the data processing method is designated by the user designated as the destination, a user identification information input portion to accept an input of user identification information, a determination portion to determine whether or not the output apparatus is identified as a home terminal of the user corresponding to the accepted user identification information, an acquiring portion to acquire said relation data from a terminal identified as a home terminal of the user corresponding to the accepted user identification information when said determination portion determines that the output apparatus is not the home terminal of the user corresponding to the accepted user identification information, a data extracting portion to extract image data based on said relation data acquired from said home terminal of the user corresponding to the accepted user identification information, and a data processing portion to process the image data extracted by the data extracting portion based on the data processing method designated in the data processing method designation portion.

14. The image data processing system according to claim 13, further comprising: a data transmission portion to transmit the image data inputted in the data input portion to the destination designated in the destination designation portion.

15. The image data processing system according to claim 13, wherein said input apparatus is a computer.

16. The image data processing system according to claim 13, wherein said destination designation portion includes a recommended processing method designation portion to designate a recommended data processing method for the image data, wherein said relation data generating portion generates relation data further associating with said recommended data processing method, and said data processing method designation portion allows to designate the recommended data processing method.

17. The image data processing system according to claim 13, wherein the data processing method for the image data designated in the data processing method designation portion is stored in association with the user identification information corresponding to the user.

18. The image data processing system according to claim 17, wherein the data processing portion automatically processes the image data based on the data processing method, stored in association with the user identification information, in response to an input of the image data.

19. The image data processing system according to claim 13, wherein the data processing method designation portion designates a protocol of a data transmission for the image data.

20. The image data processing system according to claim 13, wherein the data processing method designation portion designates an image processing for the image data and/or a post-processing for an image forming process.

21. An image data processing system comprising a plurality of image processing apparatuses connected to a network, and a computer connected to the network, wherein:

said computer includes a user data storage portion to store user data associating user identification information for identifying each user with apparatus identification information for identifying a home terminal of the user;

an input apparatus among said plurality of image processing apparatuses, wherein a job is inputted, includes a data input portion into which image data is inputted, a relation portion to associate said inputted data with the user identification information stored in the user data storage portion, a destination designation portion to designate a user identified by the user identification information associated by said relation portion as a destination, a relation data generating portion to generate relation data associating location information of said inputted data in said network with the user identification information of said designated user as the destination, a storing portion to store said relation data, and a controlling portion to cause another image processing apparatus, which is identified as a home terminal of the user designated as the destination, among said plurality of image processing apparatuses to store said relation data if the input apparatus is not identified as a home terminal of the user designated as the destination, and cause said storing portion to store said relation data if the input apparatus is the home terminal of the user designated as the destination; and an output apparatus among said plurality of image processing apparatuses, to output the job, includes, a data processing method designation portion to designate a data processing method for the image data, wherein the data processing method is designated by the user designated as the destination, a user identification information input portion to accept an input of user identification information, a determination portion to determine whether or not the output apparatus is identified as a home terminal of the user corresponding to the accepted user identification information, an acquiring portion to acquire said relation data from a terminal identified as a home terminal of the user corresponding to the accepted user identification information when said determination portion determines that the output apparatus is not the home terminal of the user corresponding to the accepted user identification information, a data extracting portion to extract image data based on said relation data acquired from said home terminal of the user corresponding to the accepted user identification information, and a data processing portion to process the image data extracted by the data extracting portion based on the data processing method designated in the data processing method designation portion.

22. An image data processing apparatus connected to a network, comprising:

a user data storage portion to store user data including user identification information for identifying each user;

in a case of functioning as an input apparatus wherein a job is inputted, a destination designation portion to display a user identified by the user identification information stored in the user data storage portion so as to designate the user as a destination;

a data designation portion to designate image data for the destination designated in the destination designation portion;

a relation data generating portion to generate relation data associating location information of said designated data in said network with the user identification information of said designated user as the destination;

a storing portion to store said relation data;
a controlling portion to cause another image processing apparatus, which is identified as a home terminal of the user designated as the destination, connected to said network to store said relation data if the input apparatus is not identified as a home terminal of the user designated as the destination, and cause said storing portion to store said relation data if the input apparatus is the home terminal of the user designated as the destination;
in a case of functioning as an output apparatus to output a job,
a data processing method designation portion to designate a data processing method for the image data, wherein the data processing method is designated by the user designated as the destination;
a user identification information input portion to accept an input of user identification information,
a determination portion to determine whether or not the output apparatus is identified as a home terminal of the user corresponding to the accepted user identification information,
an acquiring portion to acquire said relation data from a terminal identified as a home terminal of the user corresponding to the accepted user identification information when said determination portion determines that the output apparatus is not the home terminal of the user corresponding to the accepted user identification information,
a data extracting portion to extract image data based on said relation data acquired from said home terminal of the user; and
a data processing portion to process the image data extracted by the data extracting portion based on the data processing method designated in the data processing method designation portion.

23. An image data processing apparatus connected to a network, comprising:
a user data storage portion to store user data including user identification information for identifying each user;
in a case of functioning as an input apparatus wherein a job is inputted,
a data input portion into which image data is inputted;
a relation portion to associate the image data with the user identification information stored in the user data storage portion;
a destination designation portion to designate a user identified by the user identification information as a destination;
a relation data generating portion to generate relation data
associating location information of said inputted data in said network with the
user identification information of said designated user as the destination;
a storing portion to store said relation data;
a controlling portion to cause another image processing apparatus, which is identified as a home terminal of the user designated as the destination, connected to said network to store said relation data if the input apparatus is not identified as a home terminal of the user designated as the destination, and cause said storing portion to store said relation data if the input apparatus is the home terminal of the user designated as the destination;
in a case of functioning as an output apparatus to output a job,
a data processing method designation portion to designate a data processing method for the image data, wherein the data processing method is designated by the user designated as the destination;
a user identification information input portion to accept an input of user identification information,
a determination portion to determine whether or not the output apparatus is identified as a home terminal of the user corresponding to the accepted user identification information,
an acquiring portion to acquire said relation data from a terminal identified as a home terminal of the user corresponding to the accepted user identification information when said determination portion determines that the output apparatus is not the home terminal of the user corresponding to the accepted user identification information,
a data extracting portion to extract image data based on said relation data acquired from said home terminal of the user corresponding to the accepted user identification information; and
a data processing portion to process the image data extracted by the data extracting portion based on the data processing method designated in the data processing method designation portion.

24. A nontransitory computer readable medium encoded with an image data processing program for an image data processing apparatus, the program comprising the steps of:
storing user data including user identification information for identifying each user;
in setting for image data output, displaying a user identified by the user identification information stored in the storing step and allowing to designate the user as a destination;
designating image data for the designated destination;
generating relation data associating location information of said designated data in said network with the user identification information of said designated user as the destination;
storing said relation data in the image data processing apparatus;
causing another image data processing apparatus, which is identified as a home terminal of the user designated as the destination, connected to said network to store said relation data if the image data processing apparatus is not identified as a home terminal of the user designated as the destination, and to store said relation data in the image data processing apparatus if the image data processing apparatus is the home terminal of the user designated as the destination;
in outputting image data, designating a data processing method for the image data, wherein the data processing method is designated by the user designated as the destination;
accepting an input of user identification information;
determining whether or not the image data processing apparatus is identified as a home terminal of the user corresponding to the accepted user identification information,
acquiring said relation data from a terminal identified as a home terminal of the user corresponding to the accepted user identification information when said determination portion determines that the image data processing apparatus is not the home terminal of the user corresponding to the accepted user identification information, extracting image data based on said relation data acquired from said home terminal of the user corresponding to the accepted user identification information; and processing the image data extracted in the extracting step based on the data processing method designated in the step of designating the data processing method.

25. A nontransitory computer readable medium encoded with an image data processing program for an image data processing apparatus, the program comprising the steps of:

storing user data including user identification information for identifying each user;

in inputting image data, accepting an input of image data;

associating the image data with the user identification information stored in the storing step;

designating a user identified by the user identification information as a destination;

generating relation data associating location information of said inputted data in said network with the user identification information of said designated user as the destination;

storing said relation data in the image data processing apparatus;

causing another image data processing apparatus, which is identified as a home terminal of the user designated as the destination, connected to said network to store said relation data if the image data processing apparatus is not identified as a home terminal of the user designated as the destination, and to store said relation data in the image data processing apparatus if the image data processing apparatus is the home terminal of the user designated as the destination;

in outputting image data, designating a data processing method for the image data, wherein the data processing method is designated by the user designated as the destination;

accepting an input of user identification information;

determining whether or not the image data processing apparatus is identified as a home terminal of the user corresponding to the accepted user identification information, acquiring said relation data from a terminal identified as a home terminal of the user corresponding to the accepted user identification information when said determination portion determines that the image data processing apparatus is not the home terminal of the user corresponding to the accepted user identification information, extracting image data based on said relation data acquired from said home terminal of the user corresponding to the accepted user identification information; and processing the image data extracted in the extracting step based on the data processing method designated in the step of designating the data processing method.

* * * * *